(12) United States Patent
Chaney et al.

(10) Patent No.: US 6,786,948 B1
(45) Date of Patent: Sep. 7, 2004

(54) METHOD FOR PHYTOMINING OF NICKEL, COBALT AND OTHER METALS FROM SOIL

(75) Inventors: Rufus L. Chaney, Beltsville, MD (US); Jay Scott Angle, Ellicot City, MD (US); Yin-Ming Li, Potomac, MD (US)

(73) Assignees: The United States of America as represented by the Secretary of Agriculture, Washington, DC (US); University of Maryland, College Park, MD (US)

(*) Notice: Subject to any disclaimer, the term of this patent is extended or adjusted under 35 U.S.C. 154(b) by 0 days.

(21) Appl. No.: 09/147,721
(22) PCT Filed: Aug. 29, 1997
(86) PCT No.: PCT/US97/15109
§ 371 (c)(1),
(2), (4) Date: Feb. 24, 1999
(87) PCT Pub. No.: WO98/08991
PCT Pub. Date: May 3, 1998

Related U.S. Application Data
(60) Provisional application No. 60/030,462, filed on Nov. 6, 1996, and provisional application No. 60/024,928, filed on Aug. 30, 1996.

(51) Int. Cl.[7] .............................. C22B 3/24; A01C 3/00; A01C 21/00
(52) U.S. Cl. ........................... 75/58.1; 75/710; 75/711; 75/712; 210/602; 210/681; 210/682; 800/298
(58) Field of Search .......................... 75/710, 711, 712; 47/58.1; 210/602, 681, 682; 800/298, 276

(56) References Cited

U.S. PATENT DOCUMENTS

| | | | |
|---|---|---|---|
| 5,320,663 A | | 6/1994 | Cunningham ................. 75/432 |
| 5,393,426 A | | 2/1995 | Raskin et al. ................ 210/602 |
| 5,711,784 A | * | 1/1998 | Chaney et al. ................. 75/712 |
| 5,785,735 A | * | 7/1998 | Raskin et al. .................. 75/711 |
| 5,917,117 A | | 6/1999 | Ensley et al. .................. 75/711 |
| 5,927,005 A | | 7/1999 | Gardea-Torresdey et al. ............................ 47/58.1 |
| 5,928,406 A | | 7/1999 | Salt et al. ..................... 75/712 |
| 5,944,872 A | * | 8/1999 | Chaney et al. ................. 75/712 |

FOREIGN PATENT DOCUMENTS

WO    WO 00/28093    5/2000

OTHER PUBLICATIONS

Baker, et al., "The possibility of in situ heavy metal decontamination of polluted soils using crops of metal–accumulating plants", 2438 Resources, Conservation and Recycling, 11(1994), pp. 41–49.
Raskin et al., "Bioconcentration of Heavy Metal by Plants", Current Opinion in Biotechnology (1994), vol. 5, pp. 285–290.
Romero et al., "Metal Plant and Soil Pollution Indexes", Water, Air, and Soil Pollution (1987), vol. 34, pp. 374–352.

Kumar et al., "Phytoextraction: The Use of Plants to Remove Heavy Metals from Soils", Environ. Sci. Technol. (1995), vol. 29, pp. 1232–1238.
Robinson et al., "Soil Amendments Affecting Nickel and Cobalt Uptake by *Berkheya coddii*: Potential Use for Phytomining and Phytoremediation", Annals of Botany (1999), vol. 84, pp. 689–694.
Salt et al, "Phytoremediation: A Novel Strategy for the Removal of Toxic Metals from the Environment Using Plants." Biotechnology V 13 (May 1995).
Chaney et al, "Review of Information Relevant to Land Treatment of Hazardous Wastes", Interagency Agreement No. AD–12–F–0–055–0 US Environmental Protection Agency.
Morrison et al, "Nickel Uptake by Alyssum Species", Plant Science letters, 17 (1980) pp 451–457.
Homer et al, "Characterization of the Nickel–Rich Extract from the Nickel Hyperaccumulator Dichapetalum Gelonioides", Phytochemistry, vol. 30, No. 7, pp 2141–2145 (1991).
Homer et al, "Comparative Studies of Nickel, Cobalt, and Copper Uptake by Some Nickel Hyperaccumulators of the Genus Alyssum", Plant and Soil, vol. 138, pp. 195–205 (1991).
Brooks et al, "Some Observations on the Ecology, Metal Uptake and Nickel Tolerance of Alyssum Serpyllifolium Subspecies from the Iberian Peninsula." Vegetation vol. 45, pp 183–188 (1981).
Brooks et al, "The Chemical Form and Physiological Function of Nickel in Some Iberian Alyssum Species", Physiologia Plantarum 51(2), pp. 167–170 (1981).
Brooks et al, "Nickel Accumulation by European Species of the Genus Alyssum", Proc. R Soc Lond. B. 200 pp 217–224 (1978).
Brooks et al, "Detection of Nickeliferous Rocks by Analysis of Herbarium Specimens of Indicator Plants", Journal of Geochemical Exploration, 7 pp. 49–57 (1977).
Brooks et al, "Hyperaccumulation of Nickel by Alyssum Linnaeus", Pro. R. Soc. London B. 203, pp 287–403 (1979).
"Nickel in the Environment" edited by J.O. Nriagu "Accumulation of Nickel by Terrestrial Plants" by RR Brooks Wiley, NY pp 407–430 (1980).

(List continued on next page.)

*Primary Examiner*—Elizabeth F. McElwain
*Assistant Examiner*—Medina A. Ibrahim
(74) *Attorney, Agent, or Firm*—Arent Fox Kintner Plotkin & Kahn PLLC

(57) ABSTRACT

The recovery of nickel, cobalt and other metals by phytomining is described. Plants of the Alyssum genus are grown in nickel rich soil. The uptake of nickel is enhanced by maintaining specific soil conditions, including a concentration of calcium between (but not including) 0.128 mM an 5.0 mM and an acidic pH. Ni uptake may be further enhanced by maintaining a ratio of exchangeable Ca/Mg of 0.16–0.40. Uptake may be further enhanced by addition of chelating agents and ammonium based fertilizers.

11 Claims, 10 Drawing Sheets-

OTHER PUBLICATIONS

Baker et al, "The Possibility of in situ Heavy Metal Decontamination of Polluted Soils Using Crops of Metal Containing Plants", Resources, Conservation and Recycling, 11 (1994) pp 41–49.

Reeves, "The Hyperaccumulation of Nickel by Serpentine Plants", Procedings of the First International Conference on Serpentine Ecology (1991).

Reeves, "Uptake of Nickel by Species of Alyssum, Bornmuellera, and Other Genera of Old World Tribus Alysseae", Taxon 32(2): pp 184–192 (1983).

Robinson et al, "The Nickel Hyperaccumulator Plant Alyssum Bertolonii as a potential Agent for Phytoremediation and Phytomining of Nickel", Journal of Geochemical Exploration 59 (1997) pp 75–86.

de Varennes et al, "Effects of Heavy Metals on the Growth and Mineral Composition of a Nickel Hyperaccumulator", Jouranl of Plant Nutrition, 19(5), pp. 669–676 (1996).

Baker, "Terrestrial Higher Plants which Hyper–accumulate Metallic Elements—A Review of Their Distribution, Ecology and Phytochemistry", Biorecovery, 1989 vol. 1, pp. 81–126.

Vergano Gambi et al, "Investigations on a Nickel Accumulating Plant Alyssum Bertolonii Desv. I Nickel, Calcium and Magnesium content and Distribution During Growth", Abstract Webbia 32:175–88 (1977).

Gambi et al, Some Aspects of The Metabolism of Alyssum Bertolonii Desv. pp 319–329 abstract (1992).

Salt, "Phytoextraction: Present Applications and Future Promise", Bioremediation of Contaminated Soils, pp. 729–743.

Brooks, et al., "Some observations on the ecology, metal uptake and nickel tolerance of *Alyssum serpyllifolium* subspecies from the Iberian peninsula", Vegetatio 45, 183–188 (1981).

* cited by examiner

Cabbage - Shoot Yield

*A. murale* Shoot Yield

Cabbage - Shoot Ni Concentration

*A. murale* Shoot Ni Concentration

*A. pintodasilvae* Shoot Ni Concentration

*A. murale* Shoot Ni Content

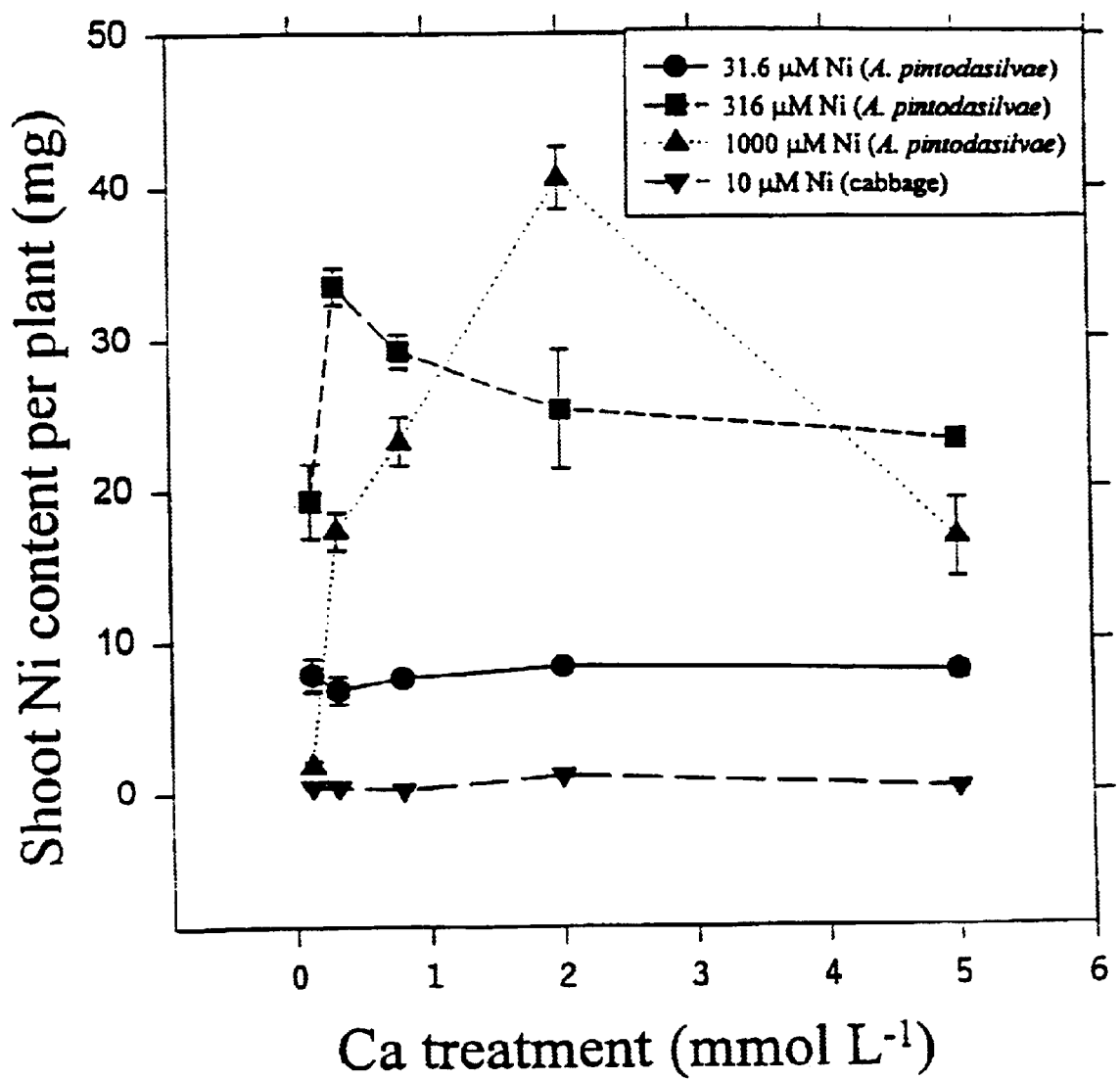

METHOD FOR PHYTOMINING OF NICKEL, COBALT AND OTHER METALS FROM SOIL

This application claims priority of U.S. Provisional Patent Application 60/024,928, filed Aug. 30, 1996 and U.S. Provisional Patent Application 60/030,462, filed Nov. 6, 1996.

The United States Government may have rights in this application, and the invention disclosed and claimed herein, by reason of Agricultural Research Contract No. 58-3k95-5-352.

BACKGROUND OF THE INVENTION

Field of the Invention

This invention pertains to a method of extracting nickel, cobalt and other metals, including the platinum and palladium metal families, from soil by cultivation of the soil with hyperaccumulating plants that concentrate these metals in above-round portions of the plants, which can be harvested, dried and smelted to recover the metal (metal phytomining).

BACKGROUND OF THE PRIOR ART

It has long been known that certain types of soil and geological materials, including serpentine, lateritic serpentine, ultramafic and meteor-impacted soils may be rich in nickel or cobalt, and are sites for mining of these metals. The cost of conventional mining for these metals remains high, and the level of metals required in geological materials to which current technology may be usefully applied are much higher than most serpentine, lateritic serpentine, ultramafic and meteor-derived soils.

This application is related to U.S. patent application Ser. No. 08/470,440, allowed, and its corresponding PCT application. In this earlier application, recovery of Ni, Co and related metals from soil is described through culturing Alyssum plants on Ni-enriched soil. The specific soil conditions described in that application include reducing calcium as far as possible, in accordance with conventional teachings regarding the inverse relationship between calcium concentration and nickel hyperaccumulation. Additionally, the application limits calcium concentrations to a value such that the exchangeable Ca/Mg ratio is below 0.20.

U.S. Pat. No. 5,364,451. Raskin et al., is directed to a method of removing metals from metal-rich soil by growing genetically altered plants of the family Brassicaceae in these soils, so as to remediate polluted soils at a reduced cost. Suitable parents for the mutants that are the subject of the Raskin patent include *B. juncea*. While the patent generally describes a large number of metals that may be recovered, specific artificial examples are directed to recovery of chromium and lead. The entire disclosure of U.S. Pat. No. 5,364,451 is incorporated herein by reference.

A review of the examples of this reference, and application of the technology proposed, illustrates continuing problems posed in rededication of metal-rich soil, and recovery of the metals therefrom. In particular, the examples set forth reflect artificial culture in sand media with intermittent feeding with phosphate to permit plants to grow without severe yield reduction and without severe lead toxicity. The patent also relies on genetic mutations that are produced by random "mutagenesis", that is, the creation of a library of mutants or potential mutants from a starting parent by indiscriminate application of a mutagen, coupled with screening the offspring to define acceptable hyperaccumulators. While promising, the Raskin patent offers little basis for an opportunity to proceed directly with soil rededication through plant growth or culturing. Additionally, the patent offers little realistic opportunity for recovery of the metal itself, indicating only that under circumstances (not identified) the metal can actually be reclaimed.

One of the most widely found, and technologically important metals is nickel. Nickel is a natural constituent in all soils, being particularly high in concentration in serpentine, lateritic serpentine, ultramafic and meteor-derived soils. Cobalt, which has chemical and geological characteristics very similar to nickel, can similarly be found in these soils, and is another valuable metal. Other metals that are also subjects for phytomining within the scope of the invention, including those of the platinum and palladium families, including palladium, rhodium, ruthenium, platinum, iridium, osmium and rhenium which commonly co-occur with Ni and Co. Cultivation of plants which are hyperaccumulators of these metals, in metal-rich soils, or "phytomining", is a desirable alternative as a means for recovering metals from soil. Ordinary cultivation methods, however, without adequate preparation and maintenance of soil conditions, does not lead to adequate hyperaccumulation of metals in the plants economically interesting. Additionally, specific methods for recovery of the metals remain to be explored.

Among the soil conditions and cultivation methods most frequently investigated, the relationship between calcium levels and nickel uptake, as well as nickel tolerance, have been frequently reported. While the reports are not uniform, in general, the prior art has reported a negative correlation between calcium concentration and nickel upgrowth. Gabrielli et al., Atti. Soc. Tosc. Sci. Nat. B38: 143–153 (1981) observed that serpentine soils typically have low levels of calcium. An increase in calcium level was reported to reduce nickel uptake. Similarly, increasing Mg and Ca has been reported to lower nickel tissue concentration in nickel accumulator species endemic to serpentine soils. Gabgrielli et al., Physiol. Plant, 62:540–544 (1984). See also, Vergano et al., The Vegetation of Ultramafic Soil, page 319–322, (1992). Thus, in general, the art teaches that raising calcium levels from the extremely low values normally encountered in serpentine soil to higher levels can be expected to yield a reduction in nickel uptake.

Similarly, a ratio recognized as important in maintaining the health of various plants endemic to serpentine soils is the exchangeable Ca/Mg ratio. Prior art reports set a ratio of about 0.67 recommended as a fertility index. Alexander et al., Soil Sci. 149:138–143 (1990). Typically, exchangeable Ca/Mg ratios in serpentine soils are at much lower values of about 0.2. Thus, the general teaching of the art is that to preserve fertility, a substantial increase in available calcium is required, which can be expected to decrease nickel uptake.

In U.S. patent application Ser. No. 08/470,440, which is incorporated in its entirely herein by reference, a method of phytomining is disclosed which calls for reduction of calcium levels, among other soil treatments. This is consistent with teachings of the prior art. Accordingly, it remains an object of those of skill in the art to develop a reliable system for phytomining of soils rich in nickel, cobalt and the other identified metals, naturally occurring or, otherwise, that will lead to a recovery of these metals at economically acceptable levels.

SUMMARY OF THE INVENTION

By screening a wide variety of plants from the Brassicaceae family, the inventors have identified plants in the Alyssum genus which may be hyperaccumulators of nickel and which accumulate valuable amounts of cobalt. By definition, hyperaccumulator plants accumulate over 1000 mg Ni or Co/kg dry weight growing in the soils where they evolved. Because cobalt occurs at about 3–10% of the level of Ni in the listed soils, Ni is the dominant toxic metal which induced evolutionary selection of the Ni hyperaccumulator plants and Co is accumulated to economically useful levels but Ni hyperaccumulation is the dominant economic benefit of the phytomining technology. Evidence suggests members of the section Odontarrhena of the genus Alyssum are likely candidates as nickel hyperaccumulators. The plant may also concentrate, in the above-ground plant tissues, metal from the platinum and palladium families, including Pd, Rh, Ru, Pt, Ir, Os and Re, in significant amounts. Accumulation of nickel in plant tissues in excess of 2.5 percent is practicable.

The metals listed accumulate in biomass by growing nickel hyperaccumulating Alyssum species in the target soils. Some 48 taxa within the section Odontarrhena of the genus Alyssum are known to be hyperaccumulators of nickel. These include the following species already evaluated: *A. murale*, and *A. pintodasilvae* (*A. serpyllifolium* ssp.), *A. malacitanum*, *A. lesbiacum*, and *A. fallacinum*. Other Ni-hyperaccumulating species which may be employed include: *A. argenteum*, *A. bertolonii*, *A. tenium*, *A. heldreichii*. About 250 other plant taxa have been shown to hyperaccumulate nickel, but many of these do not exceed 10,000 mg Ni/kg d.w., and the majority are of tropical origin.

The identified metal species are accumulated by growing the Alyssum in nickel-rich soil, under specific soil conditions. The conditions include: (1) lowering the soil pH, which increases the phytoavailability of nickel; (2) maintaining moderate levels of Ca in the soil by appropriate treatments and by use of Ca. Mg-rich soil amendments adjusted to maintain Ca levels at levels corresponding to solution values between 0.128 mM and 5.0 mM: (3) using ammonium constraining or ammonium-generating nitrogen fertilizers to improve plant growth and to increase Ni hyperaccumulation due to rhizosphere acidification; and (4) applying chelating agents to the soil to improve nickel uptake by the roots of the hyperaccumulating Alyssum species. Examples of suitable chelating agents include nitrilotriacetic acid (NTA). Other chelating agents commonly used in connection with increasing soil metal mobility for plant uptake include ethylenediaminetetraacetic acid, and ethylene glycol-bis-($\beta$-aminoethylethehr)-N, N-tetraacetic acid. Maintenance of these soil-conditioning factors will improve nickel hyperaccumulation in Alyssum, in excess of a 2.5 percent concentration in above-ground portions of the plant, particularly leaves and stems or shoots, which make for easy cultivation and metal recovery. This is preferable to concentration in the, roots, discussed in Raskin et al., which may be an aid in soil rededication if non-leachable therefrom, but does not offer convenience for phytomining. It is particularly surprising that intermediate values of Ca increase Ni uptake while values of 0.128 mM and below and 5 mM and above decrease Ni uptake. This, combined with exchangeable Ca/Mg ratios of 0.16–0.40, much lower than that recommended in the prior art, further increases Ni tissue concentrations.

BRIEF DESCRIPTION OF THE DRAWINGS

FIGS. 1–10 are graph illustrations of experimental data obtained and discussed below.

FIGS. 1–3 reflect shoot yield for given levels of Ni as a function of Ca concentration for Cabbage, *A.murale* and *A. pintodasilvae*, respectively.

FIGS. 4–6 reflect Ni levels in shoots for given levels of Ni as a function of Ca concentration for Cabbage, *A.murale* and *A. pintodasilvae*, respectively.

FIGS. 7–8 reflect the ratio of Ni in shoots/roots for *A.murale* and *A. pintodasilvae*, respectively.

FIGS. 9–10 reflect shoot Ni content at five given Ni concentration values as a function of Ca concentration for *A.murale* and *A. pintodasilvae*, respectively.

DETAILED DESCRIPTION OF THE INVENTION

Figure 1:
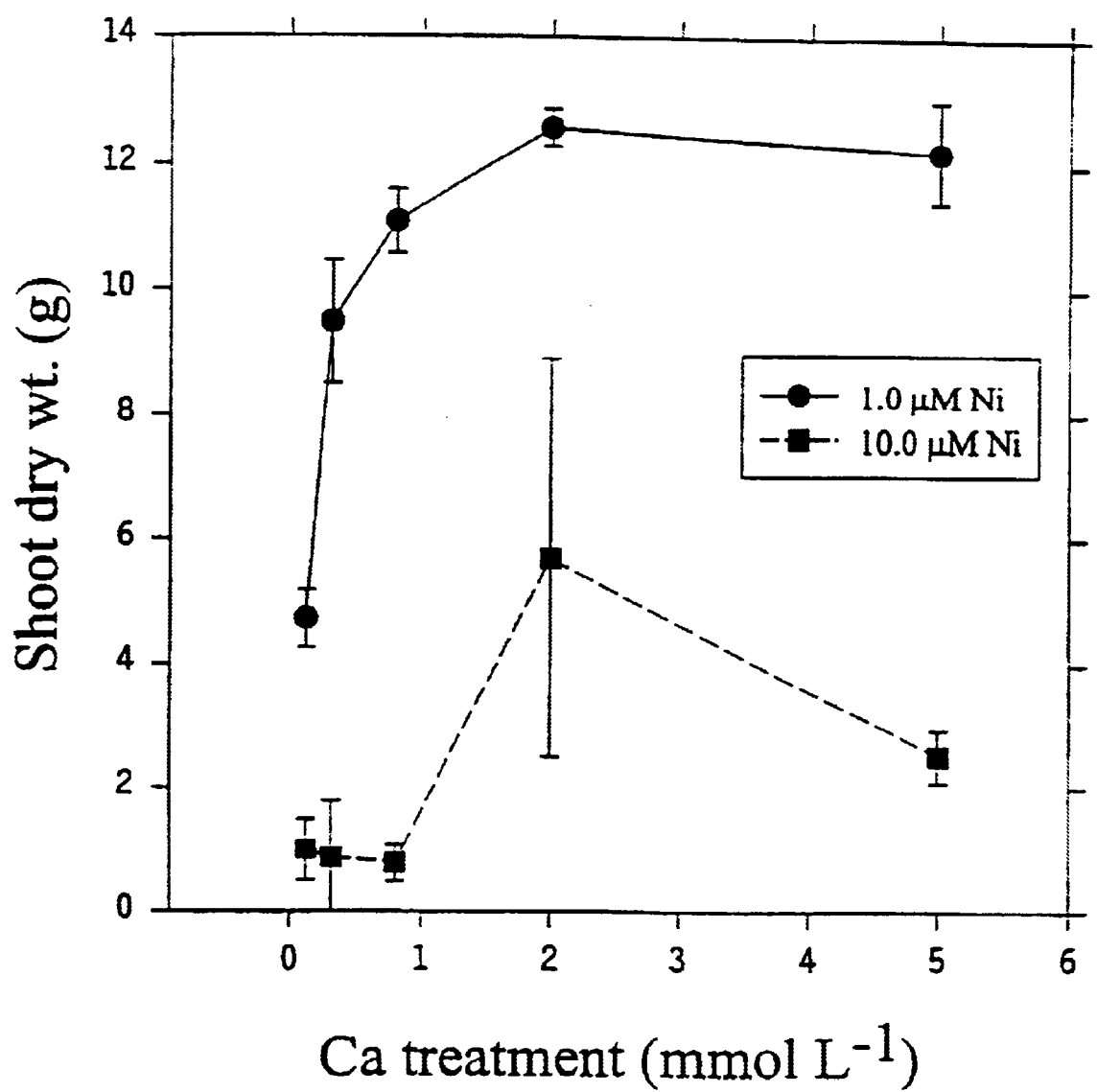

Applicants have screened a large wild-type collection of germplasm to identity hyperaccumulating plants. In particular, plants of the Brassicaceae family, particularly naturally occurring plants as opposed to those with induced mutations, such as those employed in the Raskin patent, are known to be Ni+Co accumulators. Within the family, and even with the various genera, however, wide variations in metal accumulation, to the extent it occurs, do appear. Alyssum species that are preferred candidates for use in the claimed invention concentrate and hyperaccumulate nickel, shown enhanced uptake of cobalt and may be useful in accumulating other metals. Preferred species have a preference for, and a high toxicity resistance to these metallic elements. This appears to be due to evolutionary driving forces, which permit the plant to benefit from the ecological niche presented. This should be contrasted with the response of a different Brassicaceae member, Thlaspi caerulescens, which accumulates very high levels of zinc and cadmium. While Alyssum exhibits a higher uptake rate at low nickel and cobalt concentrations than other species. Thlaspi actually grow well on soils with much higher Zn and Cd concentrations. Thus, while Alyssum concentrates nickel and cobalt over a range of concentrations. Thlaspi hyperaccumulate very high levels of Zn and Cd, some strains accumulating Ni and Co. Rather than relying on the unpredictable process of mutagenesis, the applicants in screening a large library of wild-type germplasm, have identified several Alyssum species including *A. murale*, *A. pintodasilvae* (*A. serpyllifolium* ssp.), *A. malacitanum*, *A. lesbiacum*, *A. tenium* and *A. fallacinum* as a suitable hyperaccumulators of nickel land useful in the enhanced uptake of cobalt. The same plants may also accumulate Pd, Rh, Ru, Pt, Ir, Os and Re. While these platinum and palladium metals are accumulated in lower concentrations, their greater value per unit weight, makes phytomining of these metals economically attractive as well.

Soil Management

To improve nickel and cobalt sequestration in the above-ground tissues of Alyssum plants, the soil in which they are grown is preferentially conditioned taking advantage of different factors.

These include soil pH, moderate calcium concentrations low to moderate exchangeable Ca/Mg ratios, and optionally, use of ammonium containing or generating fertilizer rather than other N-fertilizers and application of chelating agents. Each of these is considered in turn below.

Soil pH

The maintenance of preferred pH ranges in soil is well known in agriculture for a variety of reasons. Typically, pH of soil is altered or modified so as to maintain it within a near neutral range of about 6.0–7.5. Thus, soil near a limestone foundation or other building may be treated with acidifying soil amendments so as to reduce an alkaline pH. Soil with a naturally low pH may instead be treated with limestone or similar amendment, so as to increase the soil pH. A reduced pH increases the phytoavailability of nickel and cobalt. A reduced pH increases solubility and optimizes the release of these metals for absorption by the roots, and translocation to the above-ground tissues of the plant. Soil pH can be maintained in any of a variety of established methods, and the methods themselves do not constitute an aspect of this invention. Preferably, soil pH is managed at a low value by addition of sulfur and use of ammonium—N fertilizers. The Alyssum species, and indeed, any plant species, grows best at its evolved optimum pH conditions. Thus, pH cannot be reduced so low as to substantially retard or inhibit plant growth. An optimum pH range for phytomining using Alyssum is a pH of 4.5 to 6.2, preferably 5.2–6.2. After extraction of economically phytominable Ni and Co from the soil, limestone application can raise soil to pH levels required by more traditional farm crops.

Calcium Concentrations

Alyssum species which hyperaccumulate Ni and Co evolved in Ni-rich ultramafic and serpentine soils which simultaneously have low soil calcium. The presence of extremely low and extremely high calcium concentrations in soil inhibits nickel/cobalt hyperaccumulation by Alyssum. Acceptable calcium concentrations in soil ranges from 0.128 mM to 5.0 mM, as set forth in the examples below. Calcium concentrations may be maintained by any of a variety of known methods. One method involves acidification of the soil with sulfur, sulfuric acid, or other amendments and leaching, followed by use of Ca soil amendments. Whatever method is selected to adjust calcium concentration in soil, it should be selected so as to be consistent with the objective of soil phytomining.

Additional of Ammonium Fertilizer

Generally, high metal concentrations are toxic to plants, and inhibitory of plant growth. While Alyssum has developed the ability to hyperaccumulate nickel/cobalt in its above-ground plant tissues, nonetheless, fertilizer support for the growth, particularly in polluted soil, is an essential element for substantial hyperaccumulation. Use of high-ammonium N-fertilizers is of value. Nonetheless, the use of ammonium fertilizers per se is well known, and acceptable fertilizers and protocols will be arrived at by those of ordinary skill in the art on an empirical basis.

Addition of Chelating Agents

Metal chelates are commonly used in agriculture, and occur naturally is living cells. The addition of chelating agents, such a NTA, or any of a variety of amino-acetic acids known to those of ordinary skill in the art as chelating agents, to the soil to be phytomined for Ni/Co and Pt, Pd metals improves the movement of soil metals to root surfaces for uptake and translocation of these materials into the above-ground plant tissues. Any of a variety of known chelating agents of commerce may be used. A preferred chelating agent is NTA or EDTA. Typically, chelating agents will be added at 5–100 kg/ha after the plants are established. As with the use of fertilizers, optimum additions of chelating agents can be determined on an empirical basis. Chelating compounds which chelate Ni in the presence of high soil levels of Fe, Mg, and Ca selectively increase Ni uptake by the hyperaccumulator plants.

Metal Recovery

As noted, a principal object of this invention is the recovery of the metal sequestered by the hyperaccumulating plant. In U.S. Pat. No. 5,364,451, plants are identified which accumulate the metals in the roots. Recovery of metals from roots poses substantial mechanical problems, including the recovery of the root itself, as well as recovery of the metal from the root tissue. By cultivating selected Alyssum genotypes, as contemplated in the claimed invention, a very high degree of the nickel/cobalt absorbed by the roots is translocated to above-ground tissues, such as stems, leaves, flowers and other leaf and stem tissues. This feature facilitates recovery of the metal extracted from the soil. The Alyssum can be harvested in conventional fashion, that is, cutting of the plant at soil level. The harvested materials are left to dry, in much the same fashion that alfalfa is dried, so as to remove most of the water present in the plant tissues. After drying, the plant material is collected from the field by normal agricultural practices of hay-making, incinerated and reduced to an ash with or without energy recovery. This organic material may alternatively be further treated by roasting, sintering, or smelting methods which allow the metals in an ash or ore to be recovered according to conventional metal refining methods such as acid dissolution and electrowinning. With metal concentrations as high as 2.5 to 5.0% in the above-ground plant tissues, particularly leaves or shoots, metal recovery becomes economical, thus satisfying the primary objective of the invention. Conventional smelting/roasting/sintering temperatures of 500–1500° F. are sufficient to combust the organic material in the dried plant biomass, leaving a residue of the accumulated metal, with few contaminants which are known to interfere with metal refining. Indeed, it is suspected that the other components of the ash will be lower than with conventional mined ore concentrates.

EXAMPLES

Materials and Methods

Plant Material

A nutrient solution study was conducted to define the effects of Ca and Mg on Ni uptake by two know Ni hyperaccumulator species, *Alyssum murale* and *Alyssum pintodasilvae*, compared to the normal non-tolerant crop species, cabbage (*Brassia oleracea* var. *capitara*) cultivar Danish Roundhead. A varying solution concentrations of Ni (3 levels) and Ca (5 levels) were used in a factorial experimental design for Alyssum, while 2 levels of Ni and 5 levels of Ca were used in a factorial experimental design for cabbage. All solutions contained a high concentration of Mg to simulate serpentine soils where phytomining plants might be grown. Seeds for *Alyssum murale* and *Alyssum pintodasilvae* were collected from plants growing in Panorama, Thessaloniki, N. Greece and Braganca, NE Portugal.

Plant Growth

The study was conducted in an environmental growth chamber; temperature in the chamber was maintained at 25° C. day and 19° C. night, and relative humidity was set at 70%. The day period was maintained for 16 hours periods with >400 $\mu Em^{-2}$ $sec^{-1}$ photosynthetically active radiation at plant height from a combination of cool-white fluorescent and incandescent lamps.

Alyssum seeds were treated with ethanolic Arasan for 45 seconds and germinated by placing seeds in company germination bags with a macronutrient solution (1 mM Mg as $MgSO_4$; 2.5 mM $CaNO_3$ and $KNO_3$; 0.1 mM $K_2HPO_4$). The bags were kept moist all the time. After 2 weeks in the germination bags in the growth chamber, Alyssum seedlings were transferred into 8 L buckets containing a 0.5 strength Hoagland solution (1 mM Mg as $MgSO_4$; 2.5 mM $CaNO_3$ and $KNO_3$; 0.1 mM $K_2HPO_4$; 20 $\mu$M Fe as FeHBED; 75 $\mu$M KCl; 25 $\mu$M, HCl; 10 $\mu$M $H_9BO_3$. 2 $\mu$M Mn as $MnCl_2$; 05 $\mu$M Cu as $CuSO_4$; and 0.2 $\mu$M Mo as $Na_2MoO_4$; 1.0 mM Zn as $ZnSO_4$). Seedlings were maintained in these buckets for an additional 2 weeks to grow to larger or reasonable handling before transplanting to treatment solutions.

Cabbage seeds germination was begun 10 days before transplanting to treatment solutions. Cabbage seeds were placed in standard seed germination papers with the same germination macronutrient solution and showed good germination within six days.

To initiate treatments, one plant of each species was transferred to separate 1 L polyethylene beakers containing a modified 0.5 strength Hoagland solution (2 mM MG as $MgSO_4$; 2.5 mM $KNO_3$; 0.1 mM $K_2HPO_4$; 20 $\mu$M Fe as FeHBED; 73 $\mu$M KCl; 25 $\mu$M HCl; 15 $\mu$M $H_3BO_3$; 2 $\mu$M Mn as $MnCl_2$; 0.5 $\mu$M Cu as $CuSO_5$; 0.2 $\mu$M MO as $NaMoO_4$; and 1.0 mM Zn as $ZnSO_4$) with 2 mM MES to maintain solution pH at 6.2, high Mg level (2 mM and Ca and Ni treatments. FeHBED was used because even high levels of Ni or micronutrients do not displace Fe from this chelate, and dicots easily obtain the Fe by reduction.

A randomized complete block design with three replications was used. The plants were placed into polyurethane foam plant supports and inserted into a slot and hole in a black plexiglass cover. The beakers were covered with black polyethylene to minimize light exposure. Each beaker was continuously aerated.

Plants were harvested six weeks after treatment initiation. At harvest, plants were separated into roots and shoots. Shoots were rinsed with deionized water. Roots were rinsed with 2.5 mM $Ca(NO_3)_2$ to remove extracellular metals prior to rinsing with deionized water. All samples were dried at 65° C. in a forced draft oven.

Treatments

Ni was supplied as $NiSO_4 6H_2O$. Three high concentrations Ni treatments were established for the Alyssum spp. (31.6 $\mu$M. 316 $\mu$M, and 1000 $\mu$M), and two Ni treatments were established for cabbage (1.0 $\mu$M and 10.0 $\mu$M) based on preliminary studies of Ni tolerance by these species. Ca was supplied as $Ca(NO_3)_2 4H_2O$ with $NH_4NO_3$ to adjust nitrogen concentration to 10 mM for all treatments. Five Ca treatments were established for all tested species 0.128 mM, 0.32 mM, 0.8 mM, 2.0 mM, 5.0 mM $Ca(NO_3)_2$ with balancing 4.87 mM, 4.68 m<, 4.2 mM, 3.0 mM, 0.0 mM $NH_4NO_3$. Solution pH was maintained above 6.0 by the addition of 2 mM MES buffer. pH was adjusted as necessary by the addition of KOH. Fourteen days after initiation of treatment, all solutions were completely replaced, and again at 21, 28, 28 and 35 days of treatment.

Sample Analysis

Dry plant samples were ground in a stainless steel Wiley mill if necessary, 2.00 g samples were weighed into low silicate beakers and ashed in a 480° C. muffle oven for 16 hours. Ash was digested with 2 mL concentrated $HNO_3$ and heated to incipient dryness; 10 mL 3N HCl was added, the beakers heated at reflux with stirring for 2 hours. Digests were filtered, a 1.00 mL aliquot of Fisher Scientific Cobalt Reference Solution (1000 mg $L^{-1}$ Co) was added to each sample as an internal reference (40 mg $L^{-1}$ cobalt) for subsequent analysis using Inductively Coupled Plasma Emission Spectrophotometry (ICP-ES). Samples were brought to 25 mL in 1N HCl. Necessary dilutions were made in 1N HCl to maintain constant viscosity. Blanks were prepared for every 10 samples and NBS#1575 pine needles standard reference materials were digested for every 20 samples for quality assurance. Plant analysis was performed in duplicate when there was sufficient sample. Ni concentration of plants were determined using a flame atomic absorption spectrometer (AA). Zn, P, Cu, Mn, Fe, Mg, Ca, and K concentrations were analyzed by using an ICP-ES (emission spectrometer), and all results were corrected by use of the internal standard.

Statistical Analysis

Data was analyzed using SAS-PC version 6.0 (SAS institute, 1989). Data required lot transformation to attain homogeneity. The GLM procedure was utilized for analysis of variance of plant yield and tissue metal concentration for differences of treatments. Treatment means were compared using the Duncan K-ratio t-test after it was determined that there was a significant ($P<0.05$) treatment effect using the GLM procedure.

Growth and Symptoms

The experiment tested for interactions between Ca and Ni in growth and element accumulation in cabbage and two Ni hyperaccumulator Alyssum species. Alyssum murale, A. pintodasilvae, and cabbage plants all appeared healthy at the start of Ni and Ca treatments.

In the first week of growth, Alyssum spp. and cabbage plants in al treatments were green. In the second week of the trial, those Alyssum spp. plants in highest solution Ni level (100 $\mu$M) with lowest solution Ca (0.128 mM) and highest solution Ca (5 mM) started to show chlorotic symptom on young leaves, but the size was not significantly different; and those cabbage in higher solution Ni level (10 $\mu$M) almost all showed chlorotic or blown spots symptoms with curling edge in young leaves. At the fourth week of the trial, those Alyssum spp. plants in highest solution Ni level (1000 $\mu$M) with lowest solution Ca (0.123 mM) and highest solution Ca (5 mM) were visibly smaller than others; the chlorotic and necrotic symptoms in those cabbage in higher solution Ni level became more severe.

In the sixth week of the trial and just before harvesting, little chlorotic leaves symptoms were observed on those Alyssum murale plants in lowest solution Ca level (0.128 mM) across all three solution Ni levels. Smaller size and severe chlorotic symptom were significantly showed on those Alyssum plants in highest solution Ni level with lowest solution Ca level. For cabbage plants, not just those plants crown in higher solution Ni level showed chlorotic and necrotic with curling edge symptoms, but also showed on the lower solution Ca levels (0.128, 0.32 mM) in lower solution Ni. Root systems were less extensive in all plants shown severe chlorotic and/or necrotic symptoms in leaves.

For all species, low Ca (0.128–32 mM) caused reduced yield compared to normal (0.8–2.0 mM) or high solution Ca (5.0 mM), for all Ni levels. Cabbage was more sensitive to Ni phytotoxicity, than the Alyssum species and low Ca caused greater toxicity than in Alyssum. For cabbage (FIG. 1), at 1.0 $\mu$M Ni, full yield was restored by increasing solution Ca; but at 10 $\mu$M Ni, full yield was not restored at higher Ca levels. But for Alyssum species (FIG. 2 and 3), yield also declined at 5 mM Ca.

In tables 1A–1D, the analysis of variance for the main factors (solution Ca, solution Ni, plant species, block) and interactions (solution Ca-x-solution Ni within species, and solution Ca-x-solution Ni-x-species) are reported. All the main factors and interactions, except block, had significant effects ($P<0.001$) on shoot dry yield and shoot Ni concentration.

Dry Matter Yields

Cabbage

Figure 2:
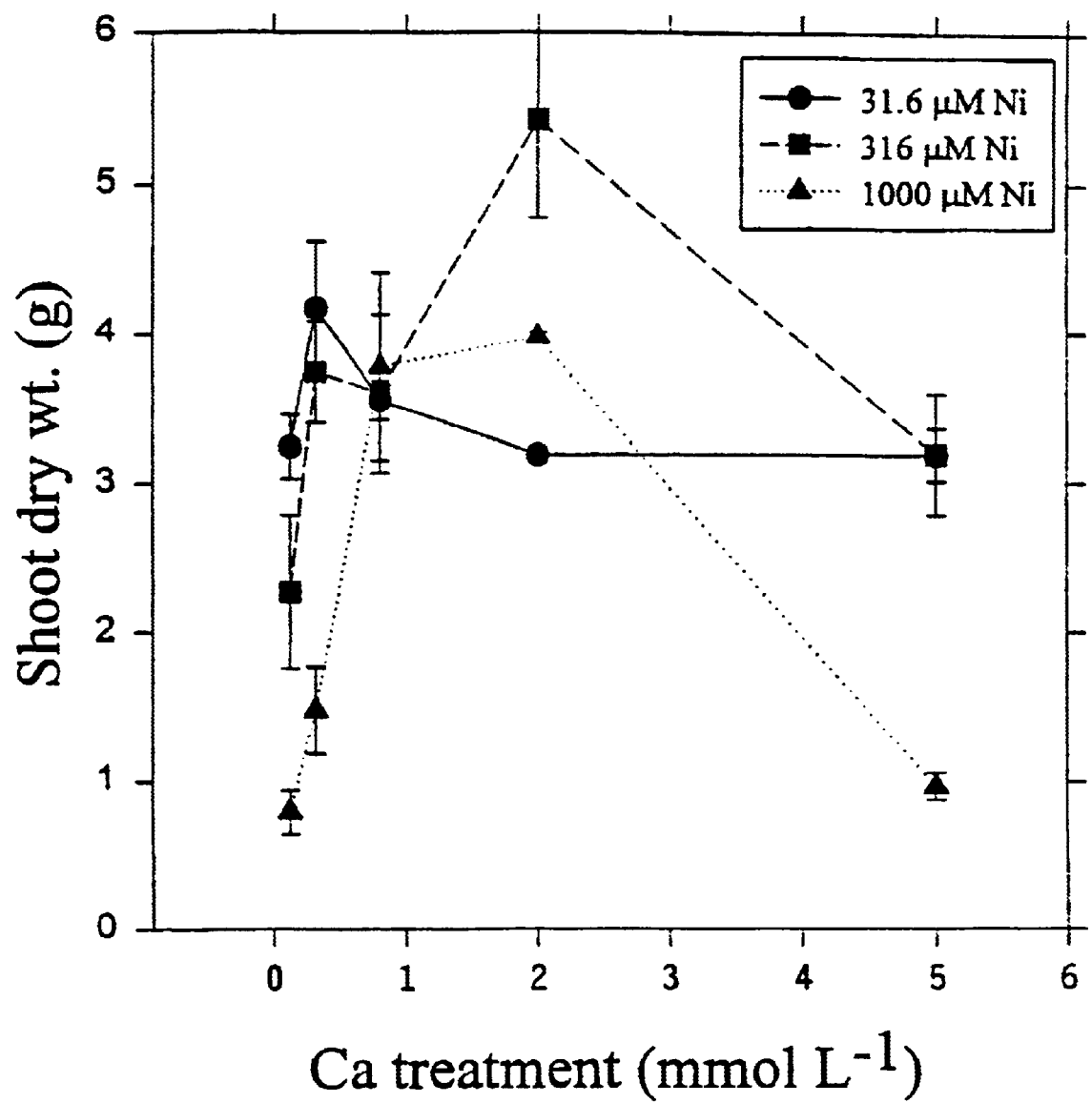

For the lower solution Ni level (1 $\mu$M), increasing solution Ca had hyperbolic effect with decreasing slope in increasing shoot dry yield (FIG. 1). For the higher solution Ni (10 $\mu$M), increasing Ca caused a 5 times shoot yield increase at 2 mM Ca, but declined at 5 mM Ca when compared to 2 mM Ca levels. The similar pattern was observed on root dry yield.

Alyssum murale

For the lower solution Ni level (31.6 $\mu$M), increasing solution Ca increased shoot dry yield (FIG. 2) up to 0.32 mM Ca and caused a progressive decline after that. For the higher solution Ni levels (316 and 1000 $\mu$M), increasing solution Ca caused shoot yield to increase 2.5–4 fold up to 2 mM Ca, but declined at 5 mM Ca. The similar pattern was observed on root dry yield in lower Ca levels, but the higher Ca levels only caused a small decline in root yield and the difference was not significant.

*Alyssum pintodasilvae*

Figure 3:
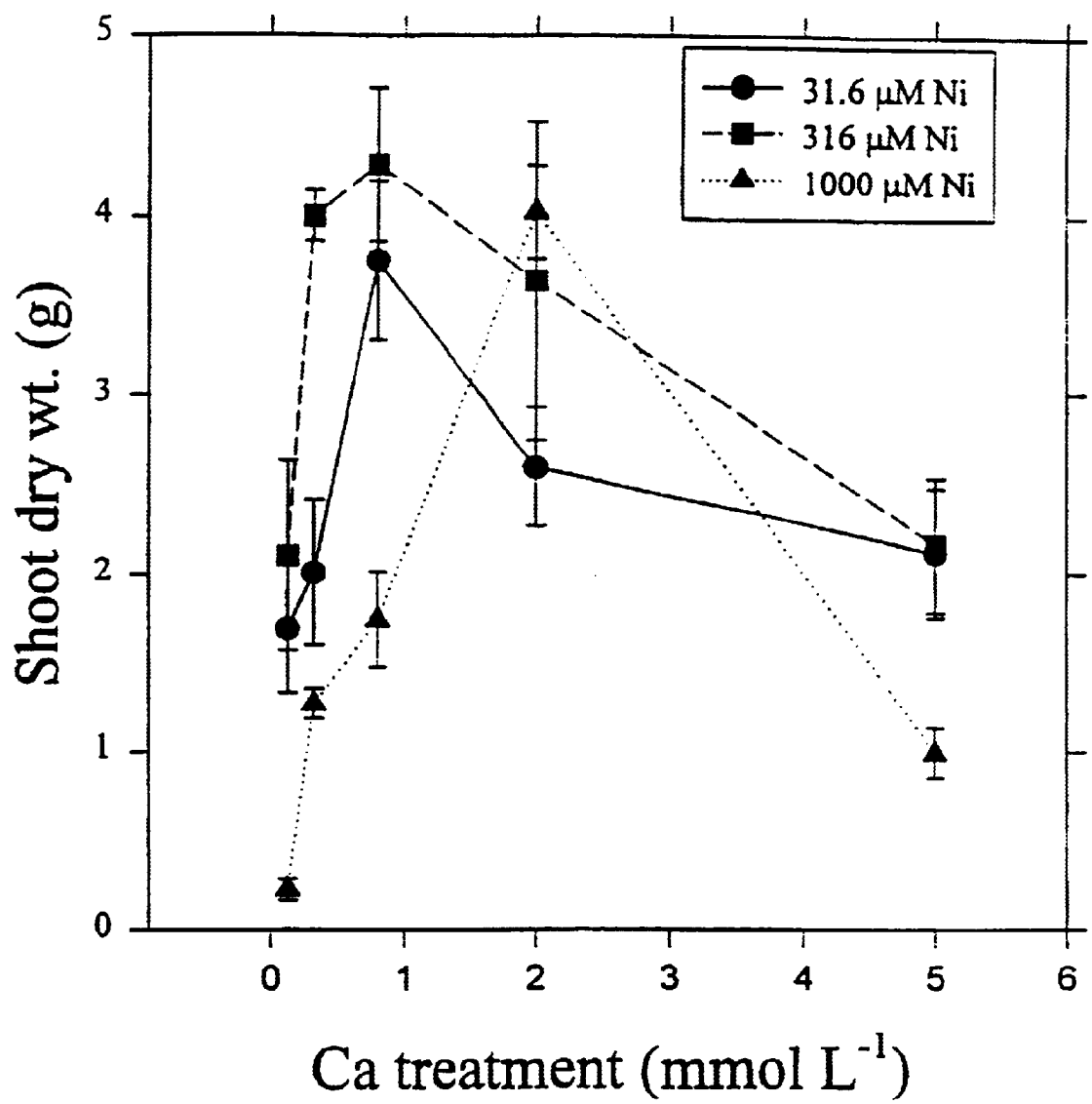

For the lower solution Ni levels (31.6 and 316 $\mu$M), increasing solution Ca increased shoot dry yield (FIGS. 3) up to 2 times up to 0.8 mM Ca and decreased yield at 5 mM Ca. A similar pattern was observed for the highest solution Ni level (1000 $\mu$M), but the highest shoot yield was obtained at 2 mM. For the lower solution Ni level (31.6 $\mu$M), increasing solution Ca had hyperbolic effect with decreasing slope on root yield (FIG. 3A1). For the middle solution Ni level (316 $\mu$M), increasing solution Ca increased shoot yield up to 0.8 mM Ca, with a progressive decline at higher Ca. For the high solution Ni level (1000 $\mu$M), a trough effect with positive slope in lower Ca levels was observed.

Across all Ni and Ca treatments (Table 3), dry matter yield of shoot, root, and whole plant were found significantly different (P<0.0001) for three species tested, except the root yield of *Alyssum murale* which was only significantly difference in P<0.05 level, the maximum shoot and root yield were attained at 31.6 $\mu$M Ni with 2 mM Ca for *Alyssum murale*, at 31.6 $\mu$M Ni with 0.8 Ca for *Alyssum murate*, and at 1.0 $\mu$M Ni with 2 mM for cabbage.

Ni Concentration and Distribution in Dry Matter

Cabbage

Figure 4:
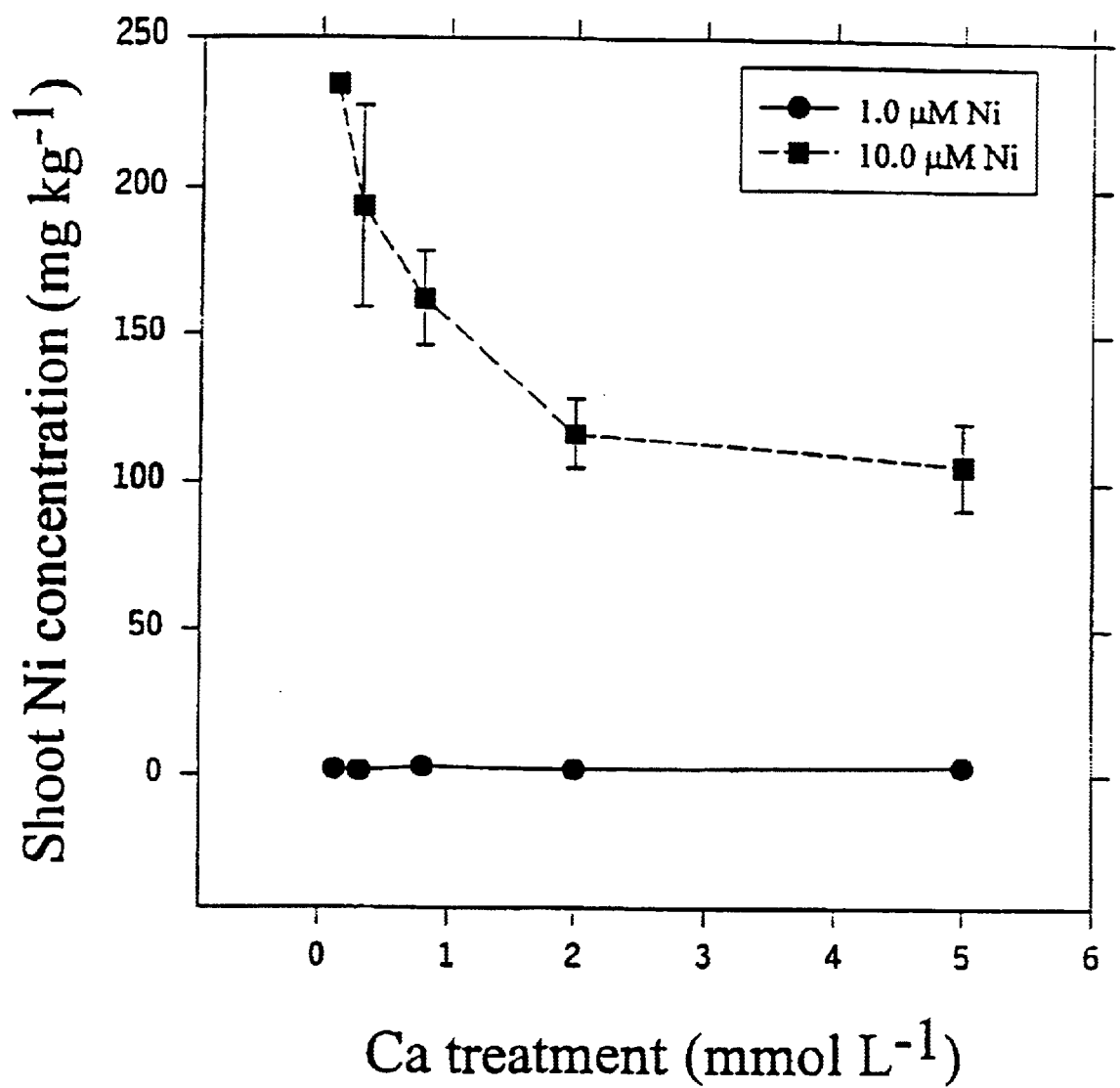

For the lower solution Ni level (1.0 $\mu$M), increasing solution Ca had no effect on shoot Ni concentration (FIG. 4). For the higher solution Ni (10 $\mu$M), increasing Ca caused a progressive decline in shoot Ni up to 2 mM Ca but did not decrease further at 5 mM Ca. The similar pattern was observed on root Ni concentration for the lower solution Ni level. A trough effect with positive slope at higher Ca levels was observed at higher solution Ni level (10 $\mu$M). *Alyssum murale* and *A. pintodasilvae*

Figure 5:
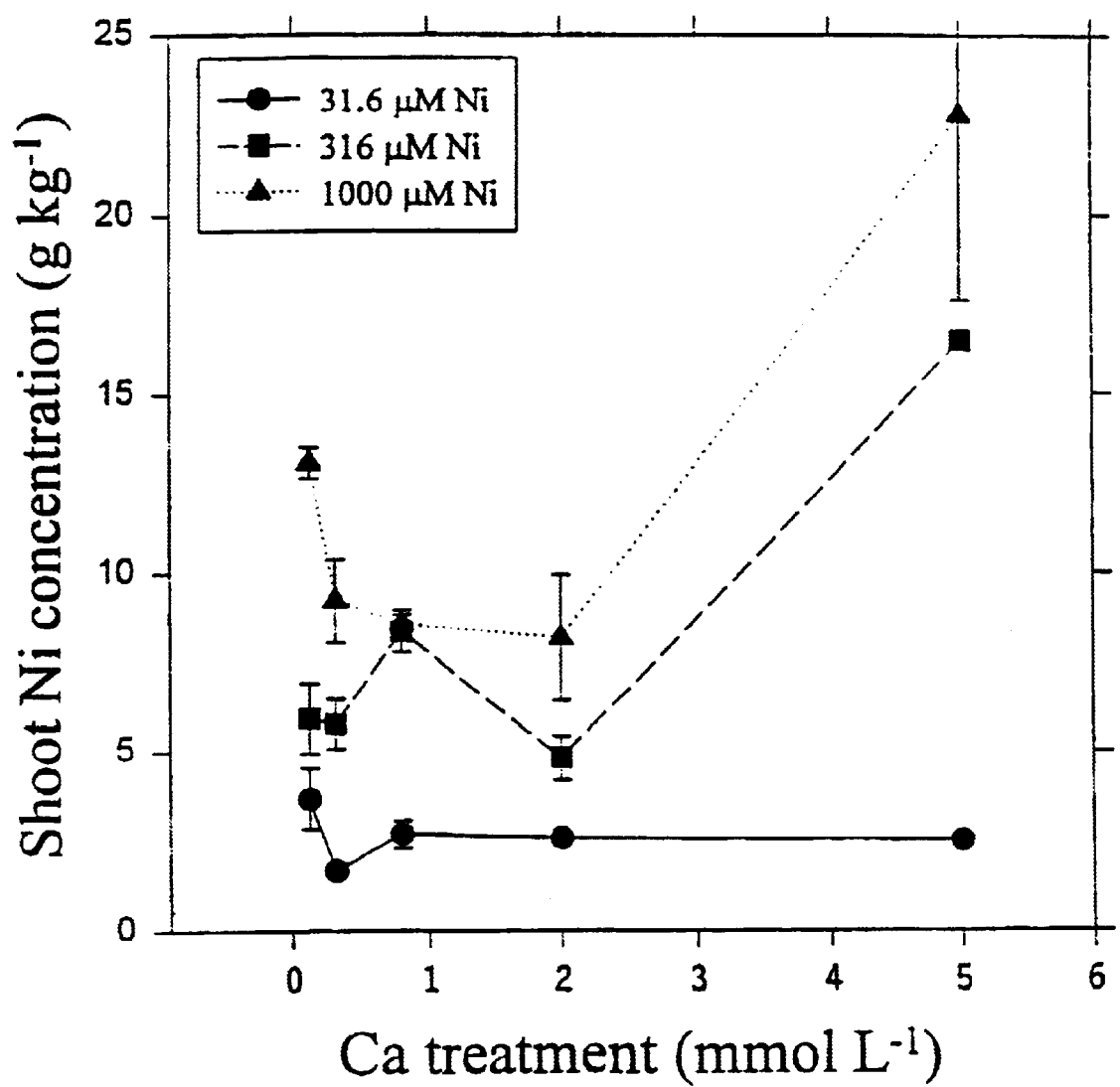
Figure 6:
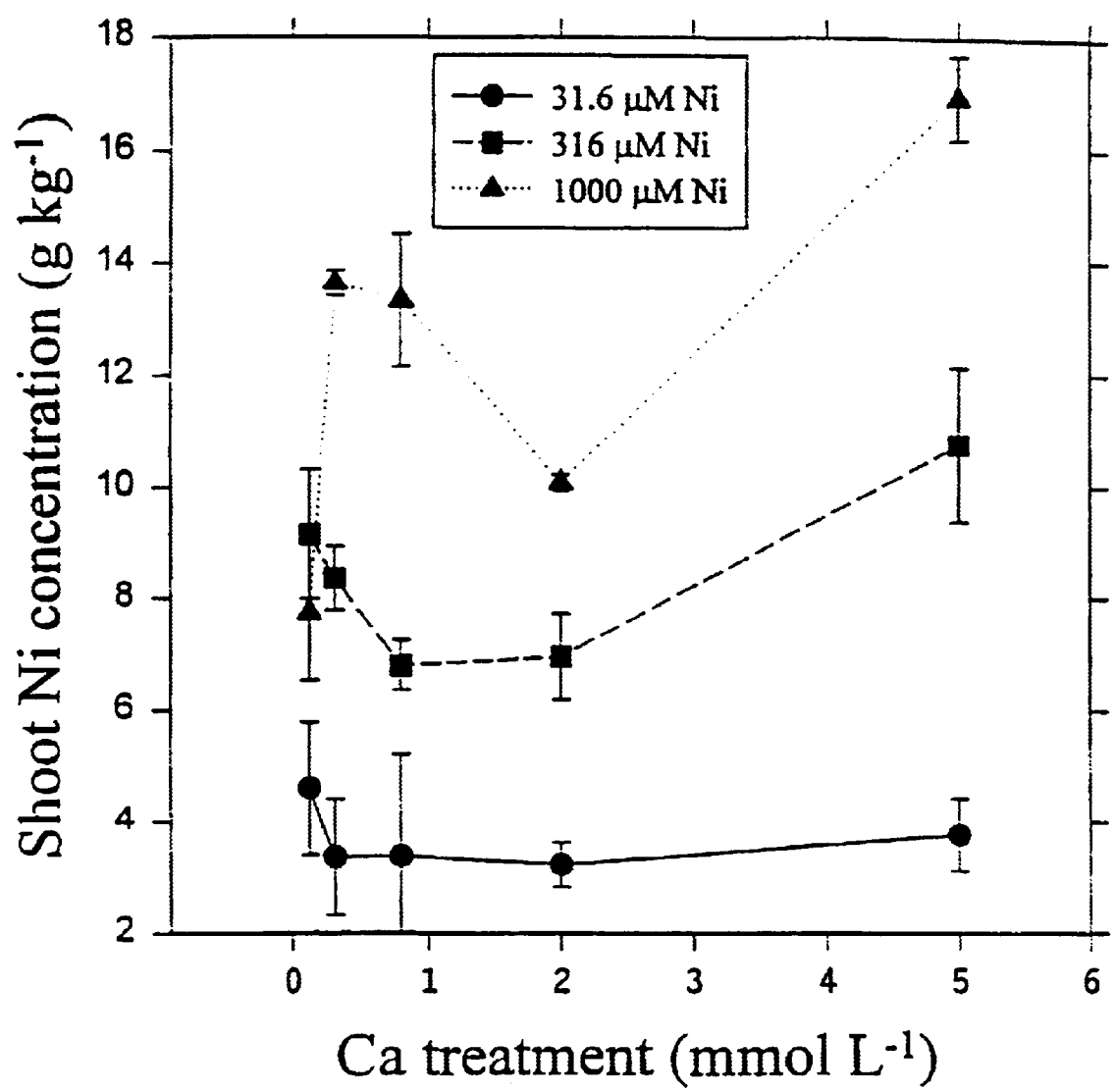

For the lower solution Ni level, increasing solution Ca decreased shoot Ni (FIGS. 5, 6) somewhat, with flat response after 0.8 mM Ca. But for the higher solution Ni levels, increasing solution Ca decreased shoot Ni at low Ca, but increased shoot Ni at high solution Ca. For *Alyssum pintodasilvae*, Ni was so toxic at the lowest Ca with 1000 $\mu$M Ni that the reduction in shoot Ni with increasing Ca at low Ca levels (0.128 to 0.31 mM) was not observed, in contrast with the pattern for 31.6 and 316 $\mu$M Ni.

For the lower solution Ni level, increasing solution Ca had a flat response on root Ni concentration of *Alyssum morale*, but decreased root Ni somewhat with flat response after 0.32 mM Ca for *A. pintodasilvae*. For the higher solution Ni levels (316 and 1000 $\mu$M), increasing Ca decreased root Ni in low Ca levels and increased root Ni after 2 mM Ca, but increasing solution Ca had no effect on root Ni at low Ca with 316 $\mu$M solution Ni for *A. murale*.

Figure 7:
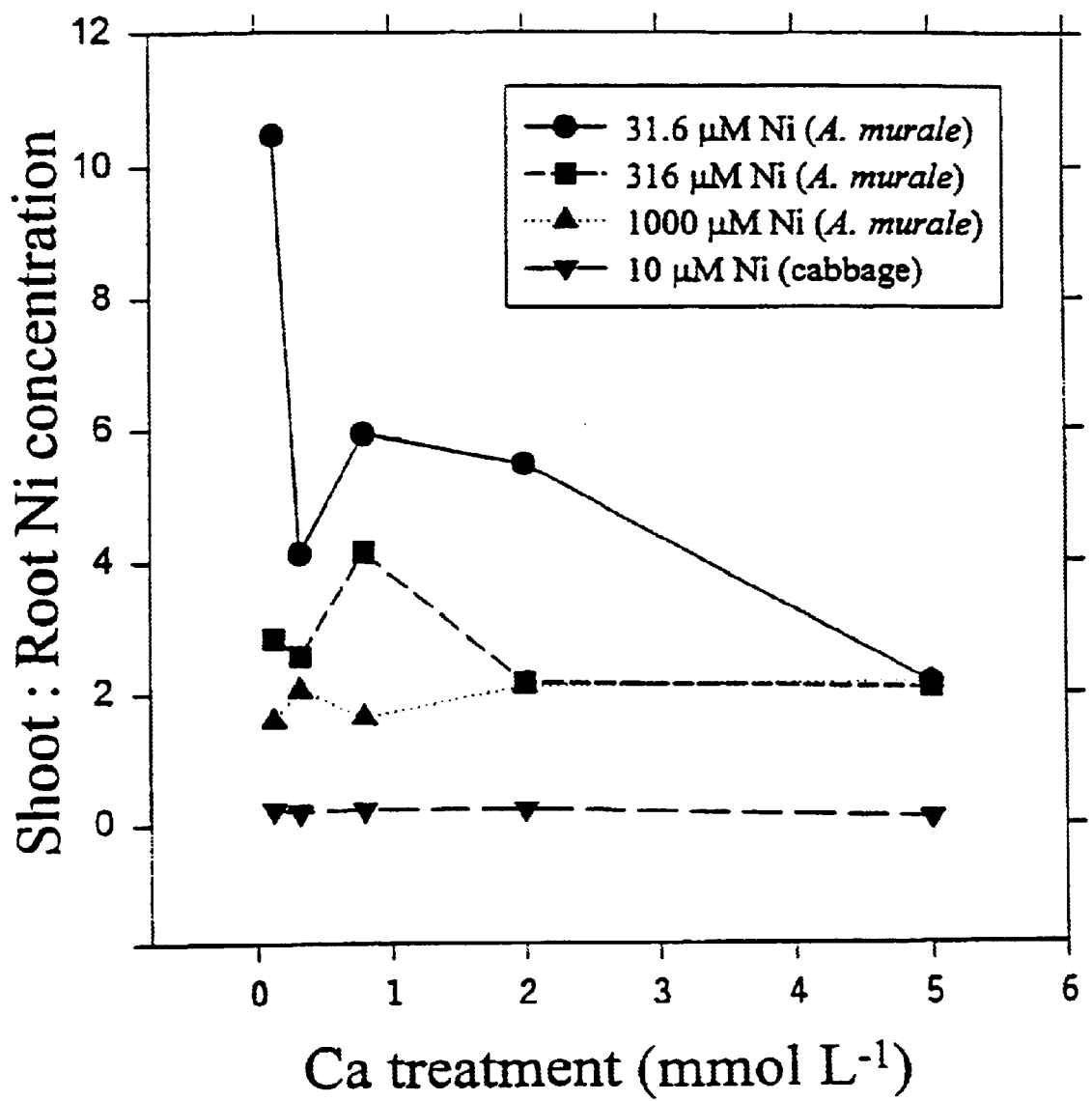
Figure 8:
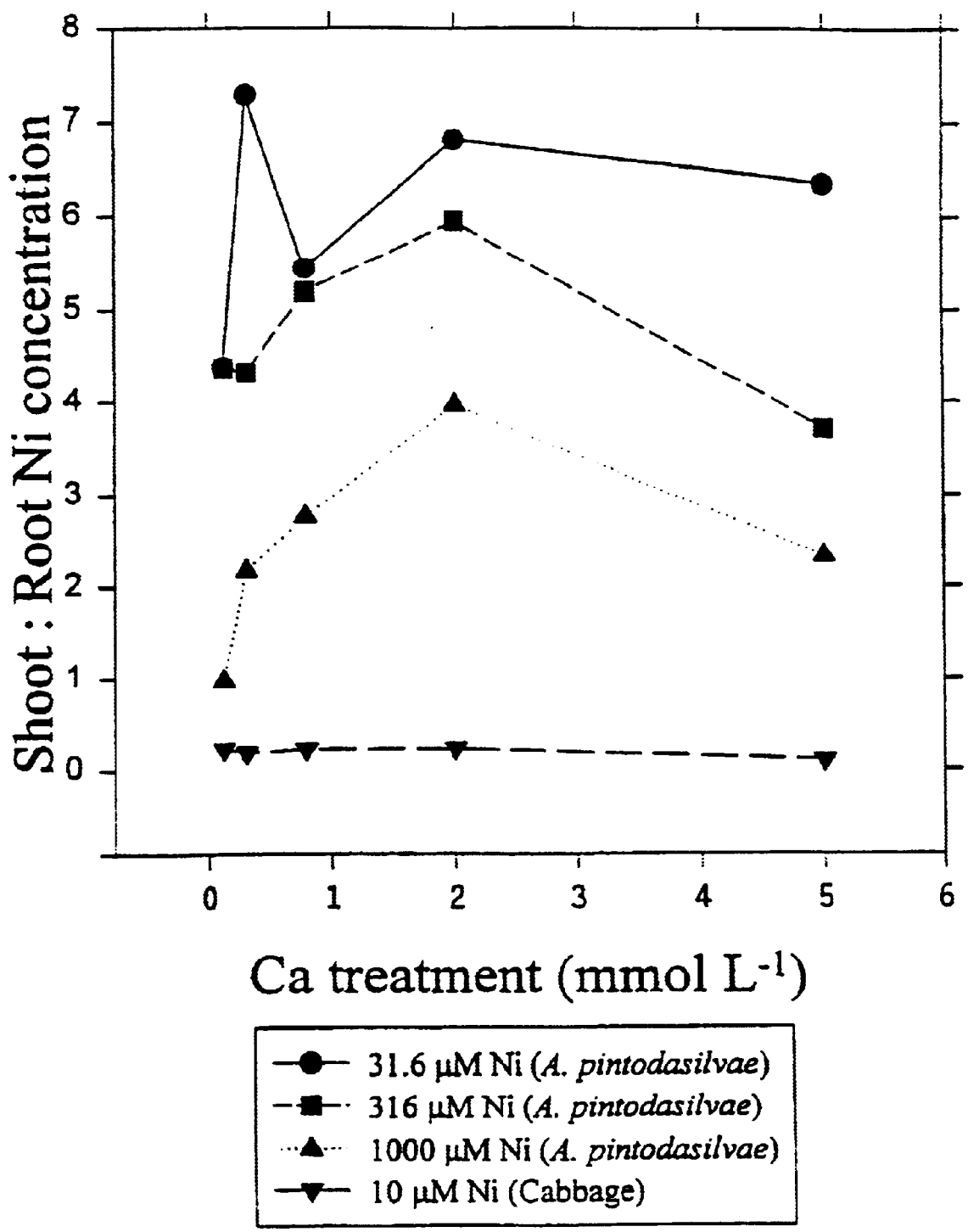

Alyssum species translocated a greater percentage of Ni to shoot tissue. Shoot contained was 84% to 98% of total plant Ni acrose all Ni and Ca treatments. Shoot Ni/root Ni concentration ratio values ranged from 1 to 10 (FIGS. 7,8), far higher than found in cabbage or in tomato (Chaney et al. 1997).

Across Ni and Ca treatments, dry matter yield, Ni concentration, and Ca concentration differences of shoot, root, and whole plant were found for the three species tested (P<0.00), except root yield of *Alyssum murale* was only significantly difference in P<0.05 and root Ca concentration of *A. murale* had no significantly difference (Table 3).

Nutrient Composition in Shoot Dry Matter

Zn concentration

Shoot Zn concentration in Alyssum spp. (Table 5A and 5B) were significantly higher in the highest solution Ca levels in 1000 $\mu$M Ni treatment, and remained similar across all Ca treatments for lower solution Ni levels. The highest shoot Zn concentration in Alyssum spp. Was observed in highest solution Ca with highest solution Ni level. However, shoot Zn concentration in cabbage (Table 5C) was significantly lower in the higher solution Ca levels for both solution Ni levels, and the highest shoot Zn concentration in cabbage was found at the highest solution Ni level with lower solution Ca levels. In general, these interaction did not cause plant Zn to be raised to toxic levels or reduced to deficient levels. In crop plants, Ni is commonly found to reduce shoot Zn concentration and had additive effect to each other when concentration is above their toxic threshold (Wallace and Berry, 1989).

Cu and Mn Concentration

Shoot Cu and Mn concentration in Alyssum spp. (Table 5A and 5B) were highest in the highest solution Ca treatment for higher solution Ni levels (316 and 1000 $\mu$M) and remained similar across all Ca treatments for lower solution Ni level (31.6 $\mu$M). The highest shoot Cu concentration in Alyssum spp. was observed in highest solution Ca with highest solution Ni level. Shoot Cu and Mn concentration in cabbage (Table 5C) decreased with increasing solution Ca for all solution Ni, except that there was no significant difference for Cu uptake in lower solution Ni level.

Fe Concentration

For *Alyssum murale* (Table 5), shoot Fe concentration was lowest in the highest solution Ca treatment in lower solution Ni (31.6 $\mu$M), and remained similar across all Ca treatments in highest solution Ni (1000 $\mu$M). For all solution Ni levels in *Alyssum pintodasilvae* (Table 5B) and middle solution Ni level (316 $\mu$M) in *A. murale*, shoot Fe concentration was highest in the normal solution Ca levels (0.8–2 mM) and lower in both lower and higher Ca treatments. The highest shoot Fe concentration in cabbage (Table 5C) was happened in lowest solution Ca with lower solution Ni level.

P Concentration

Shoot P concentration in Alyssum spp. (Table 5A and 5B) in higher solution Ni levels was lower in the normal solution Ca levels and higher in both higher and lower solution Ca levels, and remained not significantly different in lower solution Ni level. Increasing solution Ca level decreased shoot P concentration in cabbage (Table 5C) across both solution Ni levels. Shoot P was in the normal range for healthy plant growth in all treatments, the adequate shoot P concentration is 2 g/kg for most plants (Taiz and Zeiger, 1991).

Mg and Ca Concentration

Shoot Mg concentration decreased with increasing solution Ca level across all Ni treatments and species (Table 5A, B, and 5C), and shoot Ca concentration increased regularly with increasing solution Ca.

Correlation Between Ni and All Other Elements Concentration in Shoot Dry Matter There was no significant correlation between Ni concentration and M and Ca concentration in shoot for all species (Table 4A, 4B, and 4C), except Alyssum spp. had a positive correlation between Ni concentration and Ca concentration (P<0.05).

A positive correlation (P<0.001) between Ni concentration and Zn. Cu, and P concentration in shoot for all species was observed. The correlation between shoot yield and shoot Ni concentration was negative (P<0.001 for *Alyssum murale* and cabbage, but only P<0.01 for *Alyssum pintodasilvae*).

Only *Alyssum pintodasilvae* has negative correlation (P<0.001) between Ni concentration and M n and Fe concentration in shoot. Cabbage had positive correlation (P<0.001) between Ni concentration and Mn concentration in shoot.

Ni Content

Figure 9:
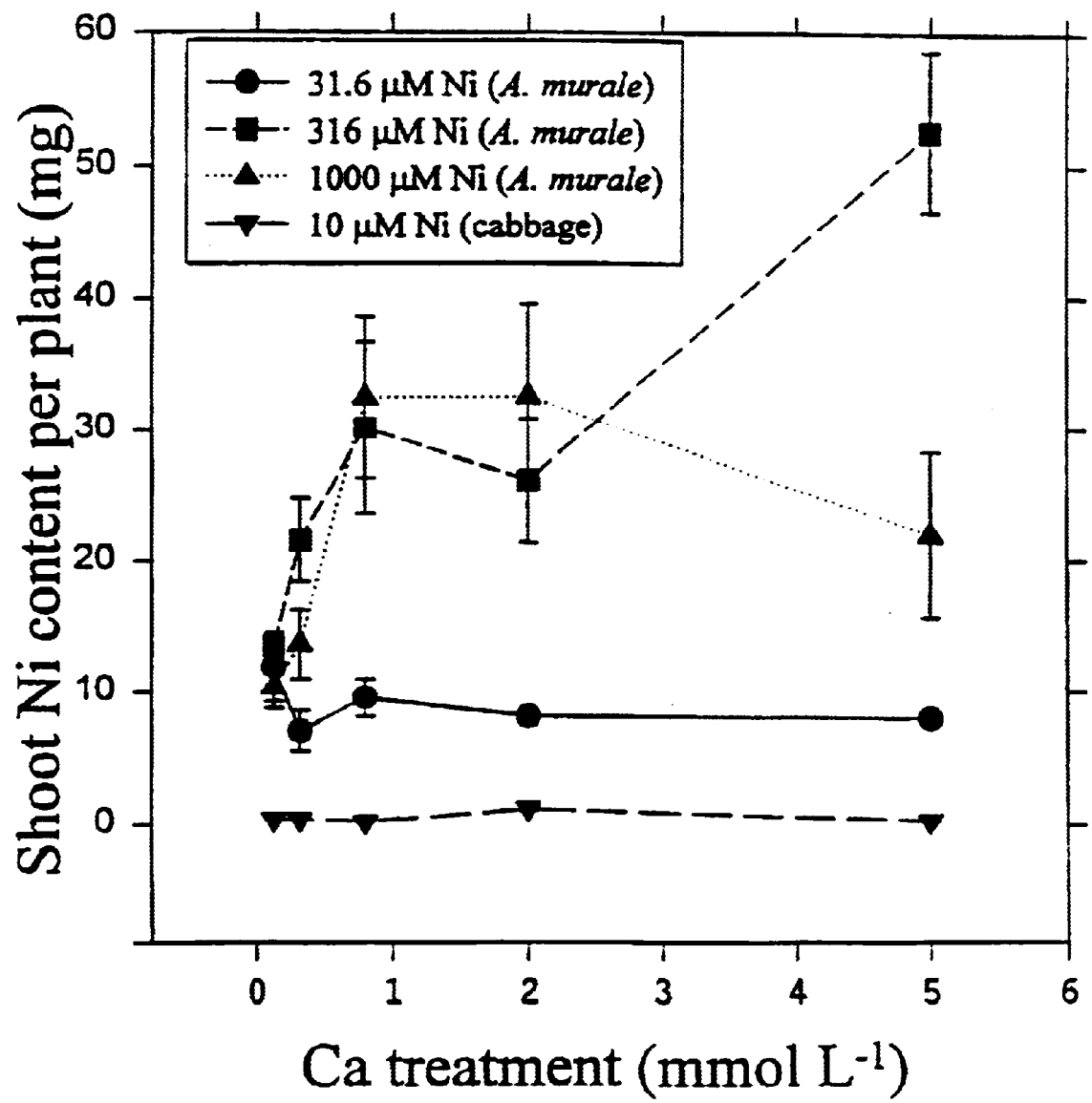

Shoot Ni content showed a similar pattern to shoot Ni concentration in *Alyssum murale* (FIG. 9), but the shoot yield was reduced remarkably due to toxicity of 1000 µM Ni combined with high Ca level (5 mM) and caused the reduction of shoot Ni content. Shoot Ni content of *Alyssum pintodasilvae* (FIG. 10) reflected the pattern of shoot yield, except the lowest solution Ni level was no difference due to low Ni concentration in shoot.

The best treatment to get maximum Ni content in shoots was 316 µM Ni with 5 mM Ca for *Alyssum murale* (50 mg/plant) and 1000 µM Ni with 2 mM Ca for *Alyssum pintodsilvae* (40 mg/plant) in 6 weeks growth period. Cabbage shoots contained only less than 1.5 mg Ni/plant in all conditions.

TABLE 1A

Mean squares (MS) for the combined analyses over species, Ni treatments, Ca treatments, and blocks on shoot yield (log g) of 2 *Alyssum* spp. and 1 cabbage reference species.

| Source | DF | MS | F values |
| --- | --- | --- | --- |
| Species | 2 | 6.7144 | 106.98*** |
| Ca trt | 4 | 4.2034 | 66.97*** |
| Species × Ca trt | 8 | 0.5064 | 8.07*** |
| Ni trt | 3 | 8.6326 | 137.55*** |
| Species × Ni trt | 2 | 0.2012 | 3.21* |
| Ni trt × Ca trt | 12 | 0.9326 | 14.86*** |
| Species × Ni trt × Ca trt | 8 | 0.2782 | 4.43*** |
| Block | 2 | 0.0207 | 0.72 |
| Error | 78 | 0.06276 | |

*, ***, Significant at the probability 0.05 and 0.001 levels, respectively.
Tests of hypotheses using the Type 1 MS for Species × Ni trt × Ca trt as the error term.

TABLE 1B

Mean squares (MS) for the combined analyses over species, Ni treatments, Ca treatments, and blocks on shoot Ni concentrations[†of 2] *Alyssum* spp. and 1 cabbage reference species.

| Source | DF | MS | F values |
| --- | --- | --- | --- |
| Species | 2 | 382.6 | 5196.*** |
| Ca trt | 4 | 0.7585 | 10.30*** |
| Species × Ca trt | 8 | 0.2762 | 3.75*** |
| Ni trt | 3 | 54.8583 | 744.90*** |
| Species × Ni trt | 2 | 0.0857 | 1.16 |
| Ni trt × Ca trt | 12 | 0.3281 | 4.45*** |
| Species × Ni trt × Ca trt | 8 | 0.2235 | 3.04** |
| Block | 2 | 0.0634 | 0.86 |
| Error | 78 | 0.0736 | |

, *, Significant at the probability 0.01 and 0.001 levels, respectively.
Type 1 MS for Species × Ni trt × Ca trt was used as the error term to test for hypothesis.
†Ni concentration is log mg L$^{-1}$.

TABLE 1C

Mean squares (MS) for the combined analyses by species, Ni treatments, Ca treatments, and blocks on shoot yield† of 2 *Alyssum* spp. and 1 cabbage reference species.

| Source | DF | MS | F values |
| --- | --- | --- | --- |
| Species: *Alyssum murale* | | | |
| Ni trt | 2 | 2.318 | 47.55*** |
| Ca trt | 4 | 1.084 | 22.24*** |
| Ni trt × Ca trt | 8 | 0.481 | 9.86*** |
| Error | 30 | 0.9157 | |
| Species: *Alyssum pintodasilvae* | | | |
| Ni trt | 2 | 3.904 | 44.43*** |
| Ca trt | 4 | 2.399 | 27.30*** |
| Ni trt × Ca trt | 8 | 0.759 | 8.64*** |
| Error | 30 | 0.0879 | |
| Species: Cabbage | | | |
| Ni trt | 1 | 13.86 | 330.67 |
| Ca trt | 4 | 1.733 | 41.35 |
| Ni trt × Ca trt | 4 | 0.8740 | 20.86 |
| Error | 20 | 0.0419 | |

*, ***, Significant at the probability 0.05 and 0.001 levels, respectively.
Type III MS for Species × Ni trt × Ca trt was used as the error term to test for hypotheses.
†shoot yield is log g.

TABLE 1D

Mean squares (MS) for the combined analyses by species, Ni treatments, Ca treatments, and blocks on shoot Ni concentration† of 2 *Alyssum* spp. and 1 cabbage reference species.

| Source | DF | MS | F values |
| --- | --- | --- | --- |
| Species: *Alyssum murale* | | | |
| Ca trt | 2 | 8.957 | 161.18*** |
| Ni trt | 4 | 0.9013 | 16.22*** |
| Ni trt × Ca trt | 8 | 0.2965 | 5.34*** |
| Error | 30 | 0.0556 | |
| Species: *Alyssum pintodasilvae* | | | |
| Ca trt | 2 | 6.650 | 104.87*** |
| Ni trt | 4 | 0.2614 | 4.12** |
| Ni trt × Ca trt | 8 | 0.2013 | 3.17** |
| Error | 30 | 0.06341 | |
| Species: Cabbage | | | |
| Ni trt | 1 | 133.5 | 1160.34*** |
| Ca trt | 4 | 0.1482 | 1.29 |
| Ni trt × Ca trt | 4 | 0.4358 | 3.79* |
| Error | 20 | 0.1151 | |

*, ***, Significant at the probability 0.05 and 0.001 levels, respectively.
Type III MS for Species × Ni trt × Ca trt was used as the error term to test for hypotheses.
†Ni concentration is log mg L$^{-1}$.

TABLE 2

Nickel concentration for Ni treatment† additions to 0.5 strength Hoagland solution with 2.0 mM MgSO$_4$, respectively.

| Treatment | Concentration | Treatment | Concentration |
| --- | --- | --- | --- |
| µM Ni | pNi$^{2+}$mol/L | µM Ca | pCa$^{2+}$mol/L |
| | | Cabbage | |
| 1.00 | 6 | 128 | 3.89 |
| 10.00 | 5 | 320 | 3.49 |

TABLE 2-continued

Nickel concentration for Ni treatment[†]additions to 0.5 strength Hoagland solution with 2.0 mM MgSO$_4$, respectively.

| Treatment | Concentration | Treatment | Concentration |
|---|---|---|---|
|  |  | 800 | 3.10 |
|  |  | 2000 | 2.70 |
|  |  | 5000 | 2.30 |
| Alyssum spp.[‡] |  |  |  |
| 31.60 | 5.50 | 128 | 3.89 |
| 316.00 | 3.50 | 320 | 3.49 |
| 1000.00 | 3.00 | 800 | 3.10 |
|  |  | 2000 | 2.70 |
|  |  | 5000 | 2.30 |

[†]NiSO$_4$ was used as nickel treatments. Due to the death of cabbage before nickel treatment reaching 31.6 mM in pre-experiment, cabbage was only applied 2 lower nickel levels.

[‡]Alyssum spp. are *Alyssum murale* and *Alyssum pintodasilvae*

TABLE 3

Mean squares from analysis of variance of shoot, root, and whole plant dry matter yield, Ni concentration, and Ca concentration for *A. murale*, *A. pintodasilvae*, and cabbage across Ca and Ni treatment, respectively.

| Source | df | Root | Shoot | Whole Plant |
|---|---|---|---|---|
|  |  | Dry matter yield log g |  |  |
| *A. murale* | 14 | 2.78* | 0.92*** | 0.95*** |
| *A. pintodasilvae* | 14 | 2.03*** | 1.68*** | 1.67*** |
| Cabbage | 9 | 7.30*** | 2.70*** | 3.00*** |
|  |  | Ni Concentration log mg kg |  |  |
| *A. murale* | 14 | 4.03*** | 1.71*** | 1.82*** |
| *A. pintodasilvae* | 14 | 3.21*** | 1.14*** | 1.21*** |
| Cabbage | 9 | 13.73*** | 15.10*** | 12.42*** |
|  |  | Ca Concentration log mg kg |  |  |
| *A. murale* | 14 | 0.480+ | 3.48*** | 2.95*** |
| *A. pintodasilvae* | 14 | 0.329*** | 2.55*** | 2.31*** |
| Cabbage | 9 | 3.06*** | 2.73*** | 2.74*** |

+, *, *** Significant at the 0.1, 0.05, and 0.001 of probabilities, respectively.

TABLE 4A

Matrix of correlation coefficient (r) of interelemental relationships in Ni hyperaccumulator, *Alyssum murale*, grown in 0.5 strength Hoagland solution with nickel and calcium treatments.

| N | Shoot dry wt. | Zn | Cu | Mn | Fe | P | Mg | Ca |
|---|---|---|---|---|---|---|---|---|
| Ni | −0.52*** | 0.76*** | 0.98*** | −0.02 | −0.22 | 0.51*** | −0.13 | 0.36* |
| Shoot dry wt. |  | −0.54*** | −0.51*** | −0.05 | −0.09 | −0.84*** | −0.26+ | −0.07 |
| Zn |  |  | 0.76*** | 0.19 | −0.06 | 0.51*** | −0.14 | 0.48*** |
| Cu |  |  |  | −0.03 | −0.29+ | 0.50*** | −0.15 | 0.40** |
| Mn |  |  |  |  | 0.03 | −0.01 | −0.19 | 0.67*** |
| Fe |  |  |  |  |  | 0.06 | 0.28+ | −0.19 |
| P |  |  |  |  |  |  | 0.29+ | −0.02 |
| Mg |  |  |  |  |  |  |  | −0.53*** |
| Ca |  |  |  |  |  |  |  |  |

+, *, , *Significant at the 0.1, 0.05, 0.01 and 0.001 probability level, respectively.
(Check reference from Brooks and Yang, 1984, Taxon 33(3): 392–399. In Ca/Mg paper file)

TABLE 4B

Matrix of correlation coefficient (r) of interelemental relationships in Ni hyperaccumulator, *Alyssum pintodasilvae*, grown in 0.5 strength Hoagland solution with nickel and calcium treatments.

| Ni | Shoot dry wt. | Zn | Cu | Mn | Fe | P | Mg | Ca |
|---|---|---|---|---|---|---|---|---|
| Ni | −0.40** | 0.70*** | 1.00*** | −0.57*** | −0.62*** | 0.57*** | 0.10 | 0.10 |
| Shoot dry wt. |  | −0.56*** | −0.41** | −0.13 | 0.42** | −0.73*** | −0.12 | −0.07 |
| Zn |  |  | 0.68*** | −0.01 | −0.32* | 0.81*** | 0.03 | 0.28+ |
| Cu |  |  |  | −0.57*** | −0.63*** | 0.58*** | 0.10 | 0.10 |
| Mn |  |  |  |  | 0.41** | −0.02 | −0.11 | 0.27+ |
| Fe |  |  |  |  |  | −0.34* | 0.00 | −0.17 |
| P |  |  |  |  |  |  | 0.19 | 0.05 |
| Mg |  |  |  |  |  |  |  | −0.66*** |
| Ca |  |  |  |  |  |  |  |  |

+, *, , *Significant at the 0.1, 0.05, 0.01 and 0.001 probability level, respectively.
(Check reference from Brooks and Yang, 1984, Taxon 33(3): 392–399. In Ca/Mg paper file)

TABLE 4C

Matrix of correlation coefficient (r) of interelemental relationships in cabbage grown in 0.5 strength Hoagland solution with nickel and calcium treatments.

| Ni | Shoot dry wt. | Zn | Cu | Mn | Fe | P | Mg | Ca |
|---|---|---|---|---|---|---|---|---|
| Ni | −0.76*** | 0.73*** | 0.78*** | 0.55** | −0.16 | 0.82*** | 0.31+ | −0.11 |
| Shoot dry wt. | | −0.74*** | −0.74*** | −0.68*** | −0.14 | −0.85*** | −0.51** | 0.18 |
| Zn | | | 0.87*** | 0.57*** | −0.10 | 0.89*** | 0.44* | −0.26 |
| Cu | | | | 0.54** | −0.09 | 0.85*** | 0.38* | −0.11 |
| Mn | | | | | 0.37* | 0.67*** | 0.76*** | −0.23 |
| Fe | | | | | | −0.06 | 0.50** | −0.17 |
| P | | | | | | | 0.40** | −0.17 |
| Mg | | | | | | | | −0.69*** |
| Ca | | | | | | | | |

+, *, , *Significant at the 0.1, 0.05, 0.01 and 0.001 probability level, respectively.
(Check reference from Brooks and Yang, 1984, Taxon 33(3): 392–399. In Ca/Mg paper file)

TABLE 5A

Elemental concentrations in shoots and roots of *Alyssum murale* grown in nutrient solution with three Ni treatments and five Ca treatments. Geometric means are presented, n = 3.

| Treatment conc. -log mol L$^{-1}$ | Yield g | Ni g kg$^{-1}$ dry wt | Zn | Cu mg kg$^{-1}$ dry wt | Mn | Fe | P | Mg g kg$^{-1}$ D wt | Ca |
|---|---|---|---|---|---|---|---|---|---|
| Shoot | | | | | | | | | |
| pNi = 4.5 Ca level | | | | | | | | | |
| 3.89 | 3.24 b | 3.67 a | 69.7 a | 21.6 a | 109. a | 95.7 a | 3.40 a | 5.75 a | 2.47 d |
| 3.49 | 4.16 a | 1.69 b | 54.4 a | 13.6 a | 102. a | 99.6 a | 2.91 a | 4.84 ab | 5.60 d |
| 3.10 | 3.56 ab | 2.68 ab | 63.2 a | 21.8 a | 128. a | 88.2 a | 3.35 a | 4.87 ab | 17.0 c |
| 2.70 | 3.19 b | 2.56 ab | 56.1 a | 22.1 a | 131. a | 87.6 a | 3.37 a | 4.46 bc | 24.5 b |
| 2.30 | 3.19 b | 2.51 ab | 65.4 a | 30.1 a | 152. a | 56.9 b | 3.14 a | 3.61 c | 39.1 a |
| pNi = 3.5 Ca level | | | | | | | | | |
| 3.89 | 2.27 b | 5.93 c | 86.7 ab | 51.2 bc | 50.9 b | 59.0 b | 3.87 ab | 4.53 ab | 1.97 c |
| 3.49 | 3.74 b | 5.77 c | 46.2 b | 43.2 c | 43.7 b | 58.2 b | 2.61 ab | 4.85 a | 3.67 c |
| 3.10 | 3.60 b | 8.37 b | 80.6 ab | 71.8 b | 54.6 b | 80.8 a | 3.74 a | 5.43 a | 11.2 bc |
| 2.70 | 5.43 a | 4.82 c | 55.3 b | 40.2 c | 37.5 b | 75.1 a | 1.92 b | 3.90 ab | 15.6 b |
| 2.30 | 3.19 b | 16.5 a | 111.8 a | 133.5 a | 163. a | 43.8 c | 3.33 ab | 2.79 b | 40.0 a |
| pNi = 3.0 Ca level | | | | | | | | | |
| 3.89 | 0.79 b | 13.1 b | 80.8 b | 98.0 b | 44.7 b | 64.0 a | 6.91 a | 5.66 a | 2.03 c |
| 3.49 | 1.48 b | 9.23 b | 63.8 h | 77.6 b | 40.8 b | 86.7 a | 4.91 a | 5.61 b | 3.98 c |
| 3.10 | 3.78 a | 8.58 b | 56.2 h | 69.7 b | 28.4 b | 57.0 a | 2.62 b | 4.72 ab | 5.86 c |
| 2.70 | 3.98 a | 8.18 b | 71.1 b | 63.5 b | 22.2 b | 62.4 a | 2.78 b | 3.25 b | 11.2 b |
| 2.30 | 0.96 b | 22.8 a | 203. a | 169.8 a | 86.4 a | 84.4 a | 5.50 a | 3.93 ab | 37.0 a |
| Root | | | | | | | | | |
| pNi = 4.5 Ca level | | | | | | | | | |
| 3.89 | 0.518 a | 0.351 a | 223. a | 20.7 a | 136. a | 361 a | 3.01 a | 1.99 b | 1.93 d |
| 3.49 | 0.560 a | 0.411 a | 65.3 a | 27.3 a | 137. a | 288 a | 2.31 a | 2.19 b | 2.19 cd |
| 3.10 | 1.08 a | 0.451 a | 166. a | 11.3 a | 162. a | 187 a | 3.05 a | 1.57 b | 2.81 c |
| 2.70 | 1.05 a | 0.466 a | 163. a | 15.6 a | 147. a | 180 a | 3.99 a | 1.59 a | 3.79 b |
| 2.30 | 0.625 a | 1.15 a | 264. a | 16.2 a | 467. a | 313 a | 4.79 a | 3.20 a | 5.31 a |
| pNi = 3.5 Ca level | | | | | | | | | |
| 3.89 | 0.641 b | 2.09 b | 439. a | 60.1 a | 41.5 b | 2640 a | 5.06 a | 2.27 ab | 1.73 c |
| 3.49 | 0.886 ab | 2.25 b | 199. b | 28.3 b | 19.0 b | 939 b | 3.81 ab | 1.94 ab | 1.72 c |
| 3.10 | 0.800 ab | 2.02 b | 212. b | 29.3 b | 26.6 b | 1230 b | 3.68 ab | 1.74 ab | 2.30 c |
| 2.70 | 1.63 a | 2.22 b | 83.9 b | 17.3 b | 20.1 b | 701 b | 2.05 b | 1.50 b | 3.46 b |
| 2.30 | 1.98 ab | 7.90 a | 155. b | 60.1 a | 196. a | 430 b | 3.38 b | 2.45 a | 4.48 q |
| pNi = 3.0 Ca level | | | | | | | | | |
| 3.89 | 0.0682 a | 8.17 ab | 320. ab | 86.0 a | 58.7 a | 1756 a | 10.5 a | 5.78 a | 3.96 a |
| 3.49 | 0.0576 a | 4.49 b | 262. ab | 159.0 a | 88.7 a | 2330 a | 7.92 a | 4.97 a | 4.26 a |
| 3.10 | 0.732 a | 5.23 b | 136. b | 48.2 a | 24.1 a | 1429 a | 3.50 a | 1.67 a | 2.01 a |

TABLE 5A-continued

Elemental concentrations in shoots and roots of *Alyssum murale* grown in nutrient solution with three Ni treatments and five Ca treatments. Geometric means are presented, n = 3.

| Treatment conc. -log mol $L^{-1}$ | Yield g | Ni g $kg^{-1}$ dry wt | Zn | Cu mg $kg^{-1}$ dry wt | Mn | Fe | P | Mg g $kg^{-1}$ D wt | Ca |
|---|---|---|---|---|---|---|---|---|---|
| 2.70 | 0.432 a | 3.86 b | 122. b | 50.3 a | 28.7 a | 2595 a | 4.16 a | 1.58 a | 3.95 a |
| 2.30 | 0.372 a | 10.5 a | 441. a | 83.8 a | 44.1 a | 2237 a | 7.61 a | 2.83 a | 5.04 a |

‡Means followed by the same letter across treatments and within a plant part are not significantly different (P = 0.05, df = 10).

TABLE 5B

Elemental concentrations in shoots and roots of *Alyssum pintodasilvae* grown in nutrient solution with three Ni treatments and five Ca treatments. Geometric means are presented, n = 3.

| Treatment conc. -log mol $L^{-1}$ | Yield g | Ni mg $kg^{-1}$ D. wt | Zn | Cu mg $kg^{-1}$ D. wt | Mn | Fe | P | Mg g $kg^{-1}$ D. wt | Ca |
|---|---|---|---|---|---|---|---|---|---|
| Shoot | | | | | | | | | |
| pNi = 4.5 Ca level | | | | | | | | | |
| 3.89 | 1.69 b | 4.60 a | 120. a | 36.7 a | 198. a | 82.1 ab | 5.34 a | 5.55 a | 5.31 d |
| 3.49 | 2.01 b | 3.36 ab | 84.0 a | 25.5 ab | 189. a | 109. ab | 3.94 a | 5.06 ab | 9.99 d |
| 3.10 | 3.75 a | 2.02 b | 62.4 a | 15.5 b | 166. a | 119. a | 3.33 a | 4.34 b | 19.2 c |
| 2.70 | 2.60 ab | 3.22 ab | 86.3 a | 26.8 ab | 181. a | 94.9 ab | 4.17 a | 4.04 bc | 40.2 b |
| 2.30 | 2.12 b | 3.77 ab | 95.3 a | 32.1 ab | 236. a | 61.3 b | 4.00 a | 3.08 c | 51.8 a |
| pNi = 3.5 Ca level | | | | | | | | | |
| 3.89 | 2.10 b | 9.16 ab | 120. a | 68.3 ab | 97.3 ab | 73.5 a | 4.83 a | 5.30 a | 3.64 d |
| 3.49 | 4.00 a | 8.37 ab | 87.9 a | 64.5 ab | 78.4 abc | 59.8 ab | 3.22 b | 5.60 a | 6.64 cd |
| 3.10 | 4.29 a | 6.81 b | 80.7 a | 52.4 b | 57.4 c | 76.6 a | 2.85 b | 4.70 ab | 12.6 c |
| 2.70 | 3.64 ab | 6.96 b | 83.8 a | 56.5 b | 63.8 c | 74.9 a | 3.08 b | 4.33 ab | 29.9 b |
| 2.30 | 2.16 b | 10.8 a | 112. a | 83.5 a | 102. a | 50.2 b | 3.80 ab | 3.35 b | 55.6 a |
| pNi = 3.0 Ca level | | | | | | | | | |
| 3.89 | 0.229 d | 7.76 c | 75.4 b | 63.2 c | 55.4 a | 20.7 c | 4.75 ab | 4.92 a | 6.83 d |
| 3.49 | 1.26 bc | 13.6 b | 136. b | 110. b | 53.1 a | 48.4 b | 6.79 a | 5.59 a | 5.49 d |
| 3.10 | 1.74 b | 13.3 b | 119. b | 106. ab | 53.4 a | 64.9 a | 5.46 ab | 5.10 a | 12.9 c |
| 2.70 | 4.02 a | 10.1 c | 85.6 b | 79.4 c | 34.6 a | 65.4 a | 3.19 b | 4.10 a | 19.3 b |
| 2.30 | 0.989 c | 16.9 a | 208. a | 131. a | 63.3 a | 28.1 c | 7.50 a | 3.88 a | 50.3 a |
| Root | | | | | | | | | |
| pNi = 3.5 Ca level | | | | | | | | | |
| 3.89 | 0.231 a | 1.050 a | 658. a | 20.9 a | 152. b | 1110. a | 4.48 a | 2.25 a | 1.78 c |
| 3.49 | 0.393 a | 0.461 b | 298. a | 13.8 a | 120. b | 437. a | 2.83 a | 1.59 b | 2.20 bc |
| 3.10 | 0.412 a | 0.371 b | 266. a | 13.5 a | 48.1 b | 529. a | 3.62 a | 1.61 b | 3.14 ab |
| 2.70 | 0.483 a | 0.473 b | 260. a | 14.2 a | 110. b | 401. a | 2.97 a | 1.25 b | 3.51 ab |
| 2.30 | 0.503 a | 0.593 ab | 290. a | 14.2 a | 472. a | 378. a | 3.99 a | 1.56 b | 4.69 a |
| pNi = 3.5 Ca level | | | | | | | | | |
| 3.89 | 0.282 b | 2.10 a | 354. a | 32.1 a | 41.9 a | 2880 a | 3.19 a | 2.15 a | 2.15 c |
| 3.49 | 0.512 ab | 1.94 a | 230. ab | 27.7 a | 32.6 a | 1860 a | 3.74 a | 1.90 a | 1.81 c |
| 3.10 | 0.804 a | 1.32 a | 117. b | 24.0 a | 28.8 a | 1240 a | 3.21 a | 1.54 a | 2.29 c |
| 2.70 | 0.545 ab | 1.17 a | 150. ab | 22.4 a | 25.2 a | 2040 a | 3.19 a | 1.36 a | 3.10 b |
| 2.30 | 0.511 ab | 2.90 a | 298. ab | 31.6 a | 35.3 a | 1440 a | 3.74 a | 1.70 a | 4.33 a |
| pNi = 3.0 Ca level | | | | | | | | | |
| 3.89 | 0.027 c | 7.95 a | 212. b | 236. a | 65.1 a | 2620 a | 7.13 a | 7.48 a | 4.06 a |
| 3.49 | 0.124 bc | 6.28 ab | 705. a | 73.1 b | 39.1 b | 3820 a | 6.50 a | 2.16 b | 2.43 a |
| 3.10 | 0.248 ab | 4.83 bc | 487. a | 39.7 b | 32.2 b | 4180 a | 4.98 ab | 1.88 b | 2.59 a |
| 2.70 | 0.463 a | 2.58 c | 199. b | 25.2 b | 22.5 b | 2140 a | 2.97 b | 1.38 b | 2.95 a |
| 2.30 | 0.225 bc | 7.26 ab | 626. a | 70.0 b | 31.5 b | 2120 a | 7.87 a | 1.71 b | 4.82 a |

‡Means followed by the same letter across treatments and within a plant part are not significantly different (P = 0.05, df = 10).

TABLE 5C

Elemental concentrations in shoots and roots of cabbage grown in nutrient solution with three Ni treatments and five Ca treatments. Geometric means are presented, n = 3.

| Treatment conc. -log mol L$^{-1}$ | Yield g | Ni g kg$^{-1}$ D. wt | Zn | Cu mg kg$^{-1}$ D. wt | Mn | Fe | P g kg$^{-1}$ D. wt | Mg | Ca |
|---|---|---|---|---|---|---|---|---|---|
| Shoot | | | | | | | | | |
| pNi = 6.0 Ca level | | | | | | | | | |
| 3.89 | 4.72 c | 0.00215 a | 56.4 a | 2.58 a | 133. a | 74.3 a | 2.10 a | 16.1 a | 3.39 d |
| 3.49 | 9.49 b | 0.00152 a | 20.3 b | 1.92 a | 58.7 b | 41.6 ab | 0.96 b | 9.06 bc | 3.45 d |
| 3.10 | 11.1 ab | 0.00297 a | 24.4 b | 2.09 a | 75.6 b | 49.4 ab | 0.93 b | 10.7 b | 10.6 c |
| 2.70 | 12.6 a | 0.00211 a | 22.1 b | 2.08 a | 70.6 b | 32.5 b | 0.80 b | 6.63 cd | 19.8 b |
| 2.30 | 12.2 a | 0.00305 a | 20.8 b | 2.23 a | 63.6 b | 42.7 ab | 0.86 b | 5.19 d | 34.2 a |
| pNi = 5.0 Ca level | | | | | | | | | |
| 3.89 | 1.62 bc | 0.234 a | 219. a | 6.03 a | 132. a | 38.0 a | 6.09 a | 15.2 a | 3.27 d |
| 3.49 | 1.87 bc | 0.193 ab | 237. a | 4.34 ab | 134. a | 50.7 a | 5.92 a | 12.6 b | 7.56 cd |
| 3.10 | 1.13 c | 0.162 bc | 209. a | 6.05 a | 103. ab | 44.6 a | 7.32 a | 9.64 c | 14.8 bc |
| 2.70 | 9.98 a | 0.116 c | 16.3 b | 2.75 b | 62.9 b | 38.9 a | 0.75 b | 6.53 c | 19.9 b |
| 2.30 | 2.51 b | 0.106 c | 83.2 ab | 3.54 ab | 98.0 ab | 35.7 a | 3.75 ab | 6.43 d | 41.7 a |
| Root | | | | | | | | | |
| pNi = 6.0 Ca level | | | | | | | | | |
| 3.89 | 1.11 b | 0.0113 a | 25.8 a | 14.8 a | 42.1 a | 130. a | 1.98 a | 3.70 b | 1.39 b |
| 3.49 | 1.89 ab | 0.0171 a | 30.3 a | 17.2 a | 31.6 a | 143. a | 1.96 a | 3.55 b | 1.47 b |
| 3.10 | 2.64 a | 0.0144 a | 18.2 a | 8.00 a | 21.5 a | 106. a | 1.24 a | 3.51 b | 1.80 b |
| 2.70 | 2.77 a | 0.0183 a | 17.5 a | 9.43 a | 20.4 a | 90.9 a | 1.33 a | 3.82 b | 3.17 b |
| 2.30 | 2.39 a | 0.0145 a | 20.0 a | 9.53 a | 39.6 a | 98.7 a | 1.57 a | 4.85 a | 42.0 a |
| pNi = 5.0 Ca level | | | | | | | | | |
| 3.89 | 0.120 b | 1.05 a | 249. a | 64.1 a | 121. a | 836. ab | 6.56 ab | 4.33 ab | 3.90 b |
| 3.49 | 0.007 b | 1.08 a | 326. a | 47.0 a | 94.1 a | 1370. ab | 5.97 ab | 3.45 b | 4.08 ab |
| 3.10 | 0.045 b | 0.733 a | 546. a | 52.3 a | 121. a | 2520. a | 11.2 a | 5.47 a | 5.61 ab |
| 2.70 | 0.893 a | 0.408 a | 61.6 a | 21.7 a | 38.7 a | 281. b | 2.32 b | 2.65 b | 4.09 ab |
| 2.30 | 0.409 ab | 0.996 a | 141. a | 25.7 a | 213. a | 367. b | 3.31 b | 2.97 b | 9.48 a |

‡Means followed by the same letter across treatments and within a plant part are not significantly different (P = 0.05, df = 10).

What is claimed is:

1. A method of recovering nickel from soil rich in nickel, comprising:

(a) growing a nickel hyperaccumulating plant selected from the genera Alyssum on said soil, while maintaining soil conditions such that the concentration of calcium in said soil is from about 0.128 mM to about 5 mM and said pH is maintained below about 7.0, (b) allowing said growth to continue until such time as the concentration of Ni in the above ground tissues of said plant is over 1000 mg per kg gross dry weight of the above ground tissues, (c) drying said above ground tissues, and (d) recovering Ni from said above ground tissues.

2. The method of claim 1, wherein said above ground tissues are selected from the group consisting of shoots, leaves, above ground tissues other than shoots and leaves, and mixtures thereof.

3. The method of claim 2, wherein said above ground tissues are leaves.

4. The method of claim 1, wherein said soil conditions are maintained such that the ratio of exchangeable Ca/Mg is between about 0.16–0.40.

5. The method of claim 1, wherein said plant is selected from a species selected from the group consisting of A. murale, A. pintodasilvae, A. malacitanum, A. lesbiacum, A. tenium, and A. fallacinum.

6. The method of claim 5, wherein said plant is selected from a species selected from the group consisting of A murale and A. pintodasilvae.

7. The method of claim 1, wherein the genotype of said plant is identical to that of the wild-type of said species and free of natural or induced mutation and heterologous DNA.

8. The method of claim 1, wherein said soil conditions are further maintained such that chelating agents which chelate Ni in the presence of Fe, Mg and Ca are added to said soil and ammonium based N-fertilizer is added to said soil, both while said plant is being grown on said soil.

9. The method of claim 1, wherein said soil is serpentine soil.

10. The method of claim 1, wherein said soil is rich in Ni due to at least one industrial process which has deposited Ni in said soil.

11. The method of claim 1, wherein the concentration of Ni in the above ground issues of said plant is at least 2.5% gross dry weight of the above-ground tissues.

* * * * *